(12) United States Patent
Barrand et al.

(10) Patent No.: US 10,820,145 B2
(45) Date of Patent: **\*Oct. 27, 2020**

(54) SYSTEMS AND METHODS FOR DEPLOYING DYNAMIC GEO-FENCES BASED ON CONTENT CONSUMPTION LEVELS IN A GEOGRAPHIC LOCATION

(71) Applicant: Oath Inc., Dulles, VA (US)

(72) Inventors: Bryce Barrand, Ashburn, VA (US); Patrick McDevitt, Hanover, NH (US)

(73) Assignee: Oath Inc., Dulles, VA (US)

( * ) Notice: Subject to any disclaimer, the term of this patent is extended or adjusted under 35 U.S.C. 154(b) by 413 days.

This patent is subject to a terminal disclaimer.

(21) Appl. No.: 15/623,013

(22) Filed: Jun. 14, 2017

(65) Prior Publication Data

US 2017/0289756 A1    Oct. 5, 2017

Related U.S. Application Data

(63) Continuation of application No. 15/381,607, filed on Dec. 16, 2016, now Pat. No. 9,712,970, which is a
(Continued)

(51) Int. Cl.
*H04W 4/021* (2018.01)
*G06Q 30/02* (2012.01)
(Continued)

(52) U.S. Cl.
CPC ........ *H04W 4/022* (2013.01); *G06Q 30/0201* (2013.01); *G06Q 30/0259* (2013.01);
(Continued)

(58) Field of Classification Search
CPC ......... H04W 4/022; H04W 4/12; H04W 4/18; H04W 4/021; G06Q 30/0201;
(Continued)

(56) References Cited

U.S. PATENT DOCUMENTS 9,043,329 B1 * 5/2015 Patton ................... G06F 16/285
707/740
2004/0166878 A1    8/2004 Erskine et al.
(Continued)

OTHER PUBLICATIONS

International Search Report and Written Opinion issued in corresponding PCT/US2015/031391, dated Aug. 20, 2015 (6 pages).

*Primary Examiner* — Evan Aspinwall
(74) *Attorney, Agent, or Firm* — Bookoff McAndrews, PLLC

(57) ABSTRACT

Systems and methods are provided for determining in real-time geographic areas having a threshold level of content consumption and deploying dynamic geo-fences to contain these geographic areas. These dynamic geo-fences provide a means for timing message notifications in order to optimize the chances of delivering targeted content to a mobile device user based on the current geographic location of the user's device relative to a threshold level of content consumption area. As mobile device users may be more likely to launch a client application in a place where other users are currently consuming content, a general message notification sent to the user's device located in a dynamic geo-fence created based on real-time content consumption, may increase the likelihood that the user will launch the client application and thereby, allow targeted content to be delivered to the user's mobile device.

20 Claims, 11 Drawing Sheets

Related U.S. Application Data continuation of application No. 14/283,932, filed on May 21, 2014, now Pat. No. 9,584,968.

(51) Int. Cl.
*H04L 12/26* (2006.01)
*H04M 1/725* (2006.01)
*H04W 4/12* (2009.01)
*H04W 4/18* (2009.01)

(52) U.S. Cl.
CPC .......... *H04L 43/0876* (2013.01); *H04L 43/16* (2013.01); *H04M 1/72522* (2013.01); *H04W 4/021* (2013.01); *H04W 4/12* (2013.01); *H04W 4/18* (2013.01)

(58) Field of Classification Search
CPC . G06Q 30/0259; H04L 43/0876; H04L 43/16; H04M 1/72522
USPC .......................................................... 707/708
See application file for complete search history.

(56) References Cited

U.S. PATENT DOCUMENTS

| | | |
|---|---|---|
| 2012/0023548 A1 | 1/2012 | Alfano et al. |
| 2012/0159568 A1 | 6/2012 | He |
| 2012/0306660 A1* | 12/2012 | Stopel ................... H04W 4/029 340/686.1 |
| 2013/0149993 A1 | 6/2013 | Cao et al. |
| 2013/0235027 A1 | 9/2013 | Sharifi et al. |
| 2013/0267196 A1 | 10/2013 | Leemet et al. |
| 2014/0344050 A1 | 11/2014 | McKinley |
| 2015/0095355 A1* | 4/2015 | Patton ..................... G06F 16/29 707/754 |
| 2015/0163629 A1 | 6/2015 | Cheung |
| 2015/0186497 A1* | 7/2015 | Patton ................... G06F 16/285 707/740 |
| 2015/0249632 A1 | 9/2015 | Barrand et al. |
| 2015/0326624 A1 | 11/2015 | Rajendran |
| 2016/0034712 A1* | 2/2016 | Patton .................... H04W 4/21 726/28 |

* cited by examiner

SYSTEMS AND METHODS FOR DEPLOYING DYNAMIC GEO-FENCES BASED ON CONTENT CONSUMPTION LEVELS IN A GEOGRAPHIC LOCATION

CROSS-REFERENCE TO RELATED APPLICATIONS

This application is a continuation of pending U.S. application Ser. No. 15/381,607, filed on Dec. 16, 2016, (now allowed) which is a continuation of U.S. application Ser. No. 14/283,932, filed May 21, 2014 (now U.S. Pat. No. 9,584, 968) all of which are incorporated herein by reference in their entirety.

TECHNICAL FIELD

The present disclosure relates generally to geo-fences and, more particularly, to optimizing messaging services to mobile device users based on their respective likelihood of opening a client application.

BACKGROUND

Mobile devices, such as smartphones, now allow users to perform a variety of tasks that traditionally required different types of devices. For example, a user may be able to use different client applications executable at the same mobile device to browse online content, play audio files, capture digital images, view directions for navigating between different locations or points of interest, and exchange messages between other users or computing devices via a mobile communication network. A user may also download and install various third-party client applications at the user's mobile device for viewing information and content related to general topics of interest. An application developer or affiliated service provider may use such a client application to provide different services to the user. Such services may include messaging services to which the user may subscribe in order to receive, for example, real-time message notifications or breaking news alerts at the user's mobile device. The message notifications or alerts that are sent (or "pushed") by a service provider for a particular client application may be displayed within a general notifications window via a user interface of the operating system at the user's mobile device, even though the client application may be closed or may not be actively executing at the mobile device when such notifications are received.

In addition to the message notifications or alerts provided by a service provider associated with the client application, third-party content providers may use the client application to deliver targeted content (e.g., advertisements) to the user at the mobile device. In contrast with the aforementioned message notifications that may be displayed within a general notifications window of the operating system's user interface, the targeted content from a third-party content provider is typically displayed within a dedicated portion of a user interface of the client application itself while it executes at the mobile device. An example of such targeted content may include, but is not limited to, an advertisement displayed within a pop-up window for a webpage loaded within a mobile web browser. Thus, conventional solutions for delivering targeted content to a user's mobile device typically require the client application to be open or actively executing at the mobile device in order for the content to be displayed to the user at the mobile device.

SUMMARY OF THE DISCLOSURE

Embodiments of the present disclosure include systems and methods for monitoring real-time content consumption and for timing message notifications to optimize delivery of targeted content to mobile device users by increasing the likelihood a user will open or execute a client application.

In certain embodiments, a user's likelihood of opening or executing a client application is determined by whether or not the user's mobile device is within a geographic area having a threshold level of content consumption. In some embodiments, content consumption may be measured as the number of mobile devices present. In other embodiments, content consumption is measured based on data usage. In other embodiments, the content consumption is measured by interaction between the user and device, including, for example, amount of content creation, the number of opened or executed client applications, the number of people using their phones for any task, the number of new pages requested by mobile devices, the number of launched web browsers, the number of ad requests from application or browsers, input and/or touch frequency, number of consumers commenting, tweeting, posting to websites and/or apps, number of comments, tweets, or posts, or any combinations thereof. A geographic area having a threshold level of content consumption could be designated when any means of measuring content consumption reach a minimum level per a unit of area over a certain segment of time. The minimum level can be preset by an application developer, affiliated service provider, or third-party content provider.

According to certain embodiments, methods are disclosed for deploying a dynamic geo-fence to contain geographic areas having a threshold level of content consumption. Monitoring content consumption by mobile devices across a plurality of users in a network; determining a level of the content consumption in a first geographic area; and if the level of the content consumption in the first geographic area is above a first threshold level of content consumption, deploying a first dynamic geo-fence containing the first geographic area. If the level of the content consumption in the first geographic area is above the first threshold level of content consumption, determining whether a level of a content consumption in a second geographic area, adjacent to the first geographic area, is above a second threshold level of content consumption; and if the level of the content consumption in the second geographic area is above the second threshold level of content consumption, deploying a second dynamic geo-fence to contain both the first geographic area and the second geographic area. In certain embodiments, the first threshold level of content consumption is the same as the second threshold level of content consumption. The method may also include creating a visual representation of mobile content consumption and current geo-fences, after deploying the first dynamic geo-fence, determining an updated level of a content consumption within the first dynamic geo-fence, determining whether the updated level of the content consumption within the first dynamic geo-fence is below the first threshold level of content consumption; and when the updated level of the content consumption within the first dynamic geo-fence is below the threshold level of content consumption, determining if a level of a content consumption in a second geographic area, within the first dynamic geo-fence, is above the threshold level of content consumption, when the level of the content consumption in the second geographic area is above the first threshold level of content consumption, decreasing the size of the first dynamic geo-fence to contain only the second geographic area, when the level of the content consumption in the second geographic area is below the first threshold level of content consumption, deleting the first dynamic geo-fence, determining if a level of a content consumption in a second geographic area, adjacent to the first dynamic geo-fence, is above the threshold level of content consumption, and, if so, increasing a size of the first dynamic geo-fence to contain both the first geographic area and the second geographic area, when a mobile device is determined to be within the first dynamic geo-fence, sending a message for display to a user at the mobile device via a message notification interface of an operating system of the mobile device, determining whether the updated level of the content consumption within the first dynamic geo-fence has increased from the level of the content consumption in the first geographic area; and updating launch statistics based on the determination, updating a success rate when the level of the content consumption within the first dynamic geo-fence is determined to have increased, updating a failure rate when the level of content consumption within the first dynamic geo-fence is determined not to have increased, storing data related to at least one of a geographic location, a duration of deployment, and a time of deployment for a plurality of dynamic geo-fences, analyzing the stored data to determine if there is a pattern associated with one of the plurality of dynamic geo-fences, and if a pattern associated with one of the plurality of dynamic geo-fences is determined, creating a historic geo-fence for the geographic location contained within the one of the plurality of dynamic geo-fences.

According to certain embodiments, systems are disclosed for deploying a dynamic geo-fence to contain geographic areas having a threshold level of content consumption. One system includes a memory having processor-readable instructions stored therein and a processor configured to access the memory and execute the processor-readable instructions, which when executed by the processor configures the processor to perform a plurality of functions, including functions to: monitor a mobile content consumption across a plurality of users; determine a level of a content consumption in a first geographic area; if the level of content consumption in the first geographic area is above a first threshold level of content consumption, deploy a first dynamic geo-fence containing the first geographic area. In certain embodiments, processor may be configured to perform functions to: determine whether a mobile device is within the first dynamic geo-fence; and if the mobile device is within the first dynamic geo-fence, send a message for display to a user at the mobile device via a message notification interface of an operating system of the mobile device.

According to certain embodiments, a computer readable medium is disclosed as storing instructions that, when executed by a computer, cause the computer to perform functions to: monitor a mobile content consumption across a plurality of users; determine a level of a content consumption in a first geographic area; if the level of content consumption in the first geographic area is above a first threshold level of content consumption, deploy a first dynamic geo-fence containing the first geographic area. In certain embodiments, computer may be configured to perform functions to: determine whether a mobile device is within the first dynamic geo-fence; and if the mobile device is within the first dynamic geo-fence, send a message for display to a user at the mobile device via a message notification interface of an operating system of the mobile device.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Figure 1A:
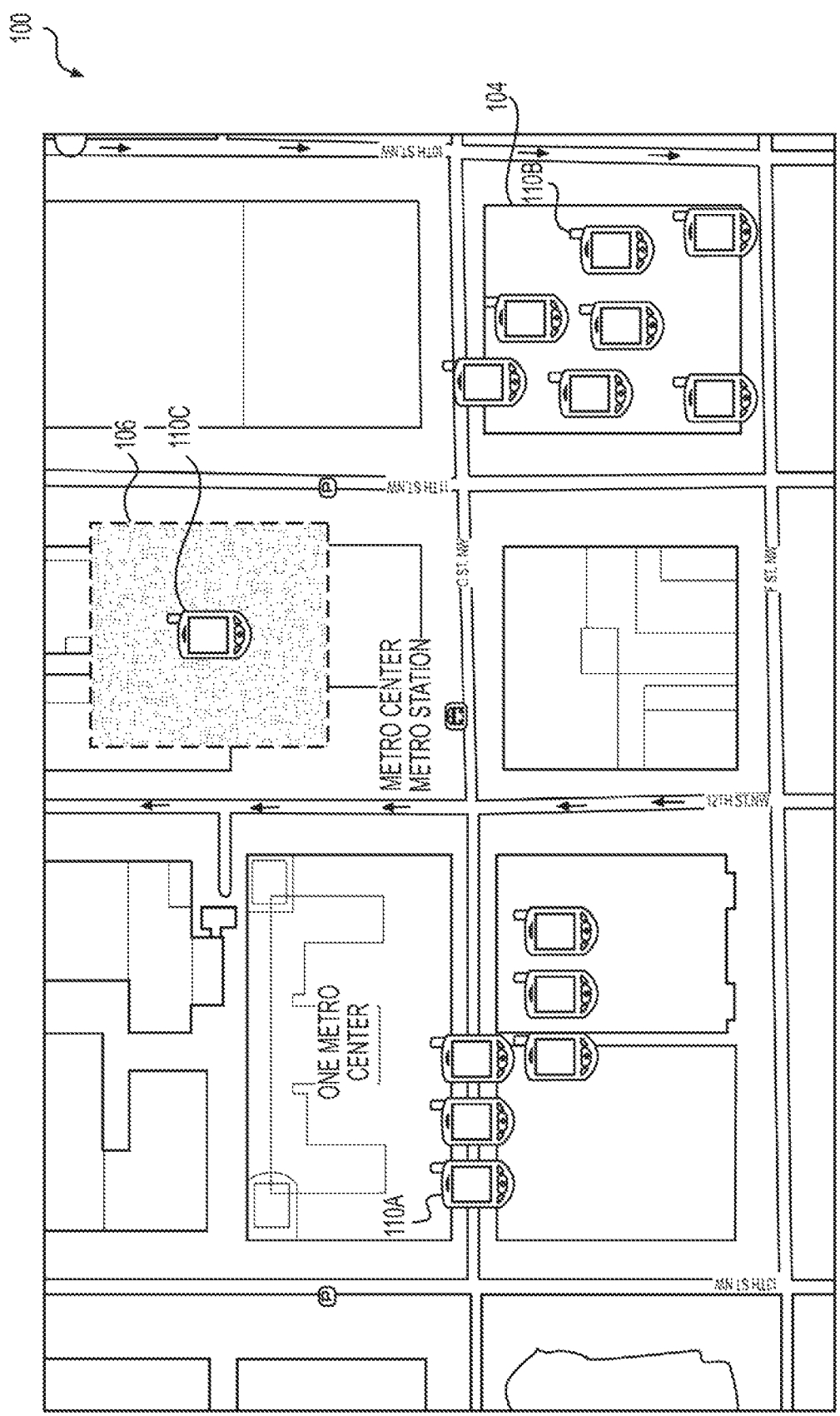
FIG. 1A is a view of an exemplary visual representation of monitored content consumption.

The present disclosure involves, among other things, determining in real-time mobile device traffic or content consumption and utilizing that information to determine the location, shape, and size of an ideal geo-fence. This disclosure describes the concept that users may be more likely to launch a client application in a location in which other users are currently consuming content on their mobile devices. Message notifications can be used to entice users to open or execute a client application. (For the purpose of this disclosure, message notification may also refer to SMS, emails, or any other method of communicating with the mobile device user.) However, the chance that a user will actually open or execute a client application when a message notification is provided to the user's mobile device is not always high. Hence, these message notifications may sometimes fail to entice the user to open a client application because they are sent when the user is in a place and/or a time when he/she is unlikely to do so. Conventional solutions do not provide a means of maximizing the odds that a user will open a client application based on the current content consumption for a particular geographic location.

The present disclosure is directed to overcoming one or more of the above referenced issues. Specifically, the present disclosure is directed to monitoring and storing content consumption in real-time in order to optimize the location and geometry of a geographic location in which a user will open or execute a client application.

Targeted content is typically displayed within a designated portion of the client application's own graphical user interface ("GUI") as it executes at the user's device, e.g., a banner advertisement presented in a bottom or top portion of the application's GUI (e.g., of a mobile browser). The targeted content is traditionally delivered to the user's device only when the client application is actively executing at the device, e.g., after the user has manually launched the application for execution via a user interface of the operating system at the mobile device. As explained in further detail below, by sending a message notification to a user, the user will be enticed to manually launch the application associated with the message notification and thereby allow the delivery of targeted content to the user at a convenience and/or effective time.

The user, however, will not always open a client application at the time a message notification is sent. The techniques disclosed herein may be used to determine in real-time geographic locations where there is an increased the likelihood that the user will launch the client application and thereby, allow targeted content to be delivered to the user's mobile device. By analyzing mobile device users as a whole, it is assumed users will be more likely to launch a client application in a location where other users are currently consuming content in relatively high volume and/or frequency. Consequently, determining what locations currently have high content consumption and delivering a message notification may entice a user to launch a client. For example, a concert venue at 9 p.m. on a specific Tuesday night (e.g. after the opening act but before the headliner starts) may have 150 mobile devices that are currently consuming large quantities of content because their users are bored by waiting for the headliner. If some of the mobile device users at the concert venue are not currently consuming content, they may also be bored and, therefore, more likely to launch a client application if urged to do so. Conversely, the next Tuesday, again at 9 p.m., there may be no event at the concert venue and only a few mobile device users may be passing by the venue. These users may not be likely to launch a client application. As a result, the odds a client application will be launched can be improved by monitoring current content consumption and waiting to send a message notification until the mobile device is within one of these fleeting or time-dependent "hot spots."

It can be determined when and where these "hot spots" for launching client applications may be, by tracking the content consumption of other users. For example, content consumption can be measured based on a number of statistics, including, but not limited to, amount of data usage, any interaction between the user and device, the number of opened or executed client applications, the number of people using their phones for any task, the number of new pages requested by mobile devices, the number of launched web browsers, the number of ad requests from applications or browsers, or any combinations thereof.

A geographic area having a threshold level of content consumption could be designated when any means of measuring content consumption (including those listed above) reaches a minimum level per unit of area over a predetermined segment of time. This minimum level can be preset by the application developer, affiliated service provider, or third-party content provider.

As briefly discussed above, by sending a message notification to a user, the user will be more likely to manually launch the application associated with the message notification and thereby, allow the delivery of targeted content to the user. The timing of the message notification can be controlled by queuing message notifications associated with a client application. The delivery of the message notification to the user's mobile device can then be delayed for a predetermined period of time or until the current geographic location of the user's mobile device is determined to be within a geographic area having a threshold level of content consumption (e.g. a "dynamic geo-fence"). When the message notification is eventually delivered to the user's mobile device and displayed within a general notifications window of the operating system's GUI at the device, the user may be more inclined to open the corresponding client application after viewing the message notification. In other words, the user may be more likely to launch the client application corresponding to a message notification (e.g., a breaking news alert) displayed at the user's device after viewing the message notification.

In an example, an application developer or affiliated information service provider, e.g., a news agency or other media outlet, associated with a client application may provide a mobile messaging service, to which the user may subscribe so as to authorize the service provider to send (e.g., "push") real-time message notifications (e.g., breaking news or other alerts) to the user's device via a mobile communication network. The notifications sent by a service provider associated with a client application executable at the user's device may be displayed within a general notifications window of a GUI of the device's operating system, even when the corresponding client application may not have been launched by the user or be actively executing at the mobile device.

It may be assumed that the mobile device user in the above example may be relatively unaware of the third-party content provider. Thus, while a user who has subscribed to messaging services offered by a service provider associated with a client application executable at the user's device may have authorized the application service provider to send general message notifications (e.g., push notifications) related to topics of interest to the user's device, the user may not have explicitly requested third-party content providers to send targeted content to the user's device in the same way. However, it may also be assumed for purposes of this example that the user has at least implicitly requested or authorized third-party content providers (e.g., with whom the application service provider may have entered into a partnership agreement) to deliver targeted content to the user's mobile device within a designated portion of the application's GUI while the client application is actively executing at the user's device (e.g., pursuant to terms and conditions of use accepted by the user).

In the above example, an authorized third-party content provider may also use the client application to deliver targeted content to the user's mobile device. To increase the probability that the user will open a particular client application, the push-notification may be timed to coincide with times when the user is in the dynamic geo-fence, meaning that other users are currently consuming at least a threshold level of content in that location.

In some implementations, the mobile operating system may allow the user to launch the client application associated with a particular notification directly from the notification window by selecting the notification as it is displayed via the operating system GUI at the mobile device. Thus, the techniques disclosed herein may be used to optimize the timing of the message notification displayed at the user's device so as to increase the probability that the corresponding client application is launched because the user is in an area determined to be a geographic area having a threshold level of content consumption, e.g., by enticing the user to launch the client application when it is inactive, after viewing the message notification.

Further, once a client application is opened or executed, the specific targeted content that is sent to the user's mobile device at a particular time may also be based on the current geographic location of the mobile device. The delivery of such geo-located content to the user's device may be triggered when, for example, the location of the user's mobile device is determined to be within a designated geographic area, e.g., covered by a geo-fence associated with the targeted content.

Figure 1B:
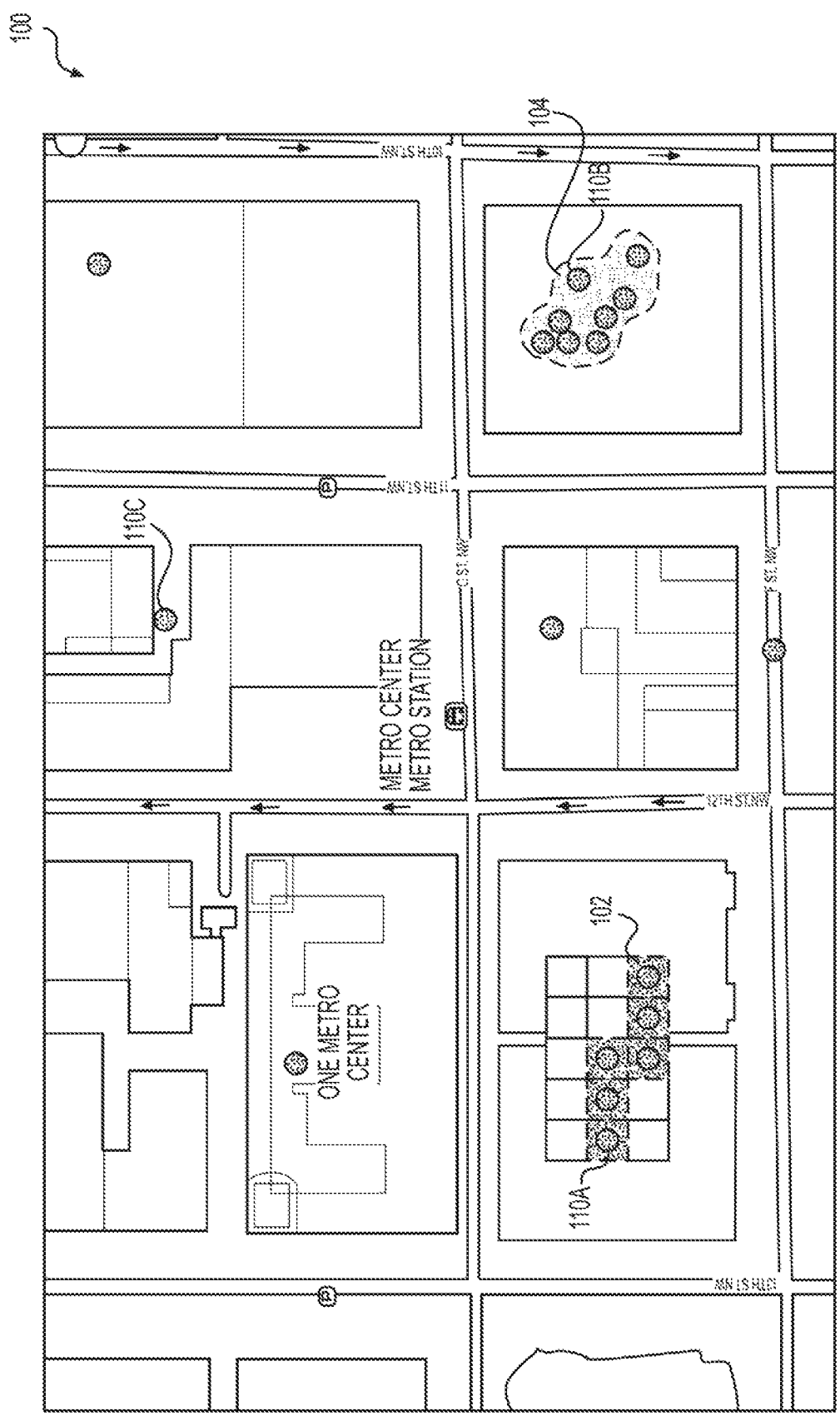
FIG. 1B is an exemplary visual representation of monitored content consumption and multiple geo-fenced areas determined to have a threshold level of content consumption.

As shown in FIGS. 1A-B, map 100 indicates the geographic locations of a user device 110a, a user device 110b, and a user device 110c. Each of user devices 110a, 110b, and 110c may be implemented using, for example, any type of mobile computing device including, but not limited to, a laptop computer, tablet computer, mobile handset, smartphone, personal digital assistant (PDA), a dedicated portable Global Positioning System (GPS) navigation device, or similar type of mobile device. Further, each of user devices 110a, 110b, and 110c may be equipped with a GPS receiver or equivalent for registering GPS location data, e.g., latitude and longitude coordinates, at a particular point or over a period of time. However, it should be noted that the physical or geographic location of each of user devices 110a, 110b, and 110c may be determined or estimated using any one or a combination of various well-known techniques for deriving such geographic location information. Examples of such techniques include, but are not limited to, GPS, cell identification (e.g., using Cell ID), cellular tower triangulation, multilateration, Wi-Fi, and any other network or handset based technique for deriving or estimating the physical or geographic location of a mobile device via a mobile communication network.

FIG. 1A is a view of a map 100 that also illustrates an exemplary embodiment of monitoring and then visually representing content consumption. (See e.g., step 301 of FIG. 3 and steps 602 and 604 of FIG. 6.) Such monitoring and mapping may be implemented by a monitoring server. For exemplary purposes, the mobile devices 110a, 110b, and 110c in FIG. 1A symbolize a user interacting with a mobile device and correspond to the dots in FIG. 1B. Visual representations of the current mobile device landscape are not limited to the maps depicted in FIGS. 1A-B. Visual representations of the current mobile device landscape may also include designations between historic, permanent, and dynamic geo-fences, between providers or types of mobile devices, or between quantity of content consumption. Visual representations of the current mobile device landscape may represent content consumption in any way. For example, the visual representation may also be a heat map, in which, for example, if there are between 100 and 200 advertisement requests within a square mile, that area will be red, but if there are between 50-100 advertisement requests within another square mile then that area may be purple or if between 0-50 advertisement requests that area will be blue. Content consumption may also be represented by varying a size of indicia. For example, the more data usage in an area the larger a dot may be.

Figure 3:
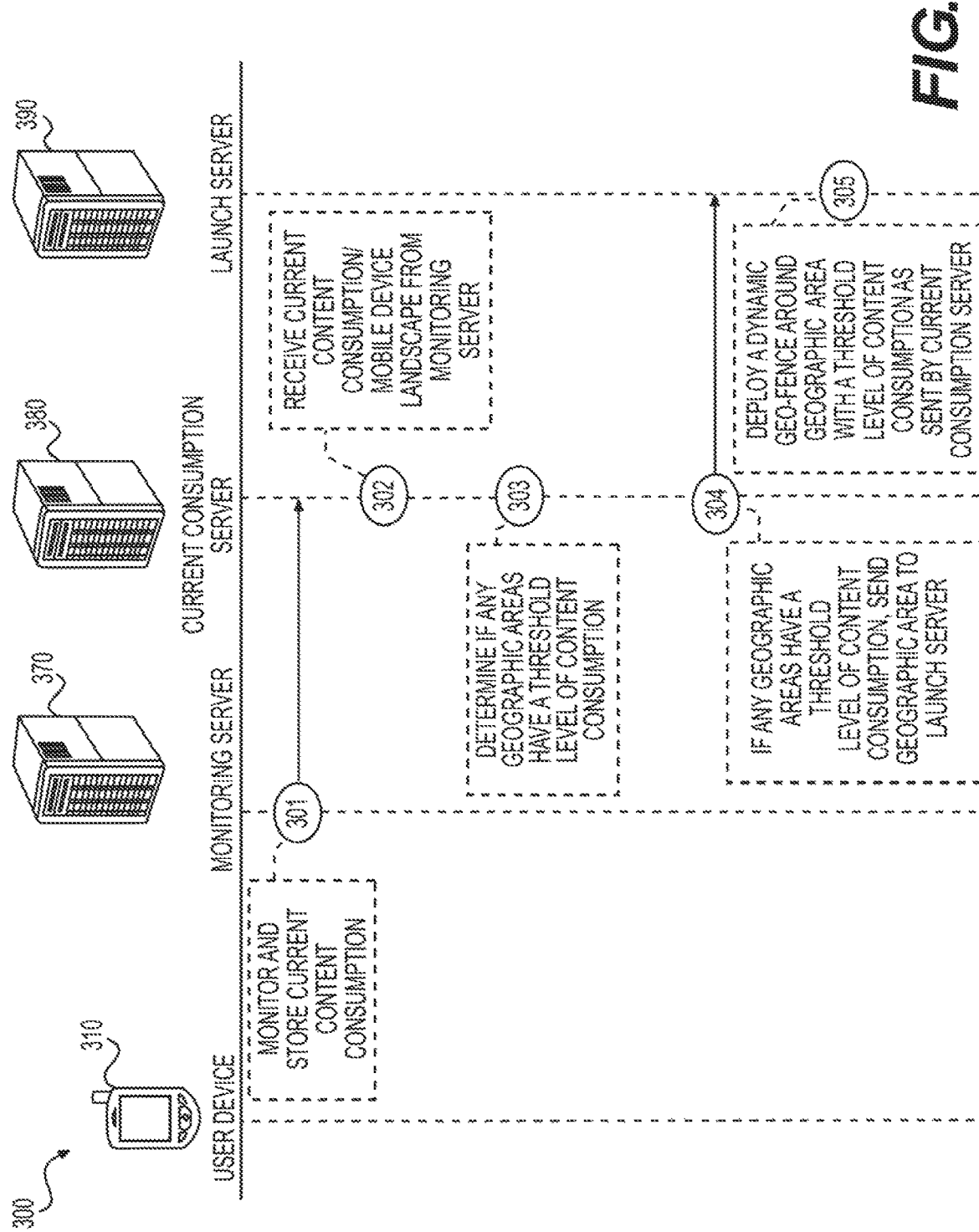
FIG. 3 is a communication flow diagram of an exemplary process for determining in real-time what geographic areas currently have a threshold level of content consumption and deploying dynamic geo-fences to cover those geographic areas.
Figure 6:
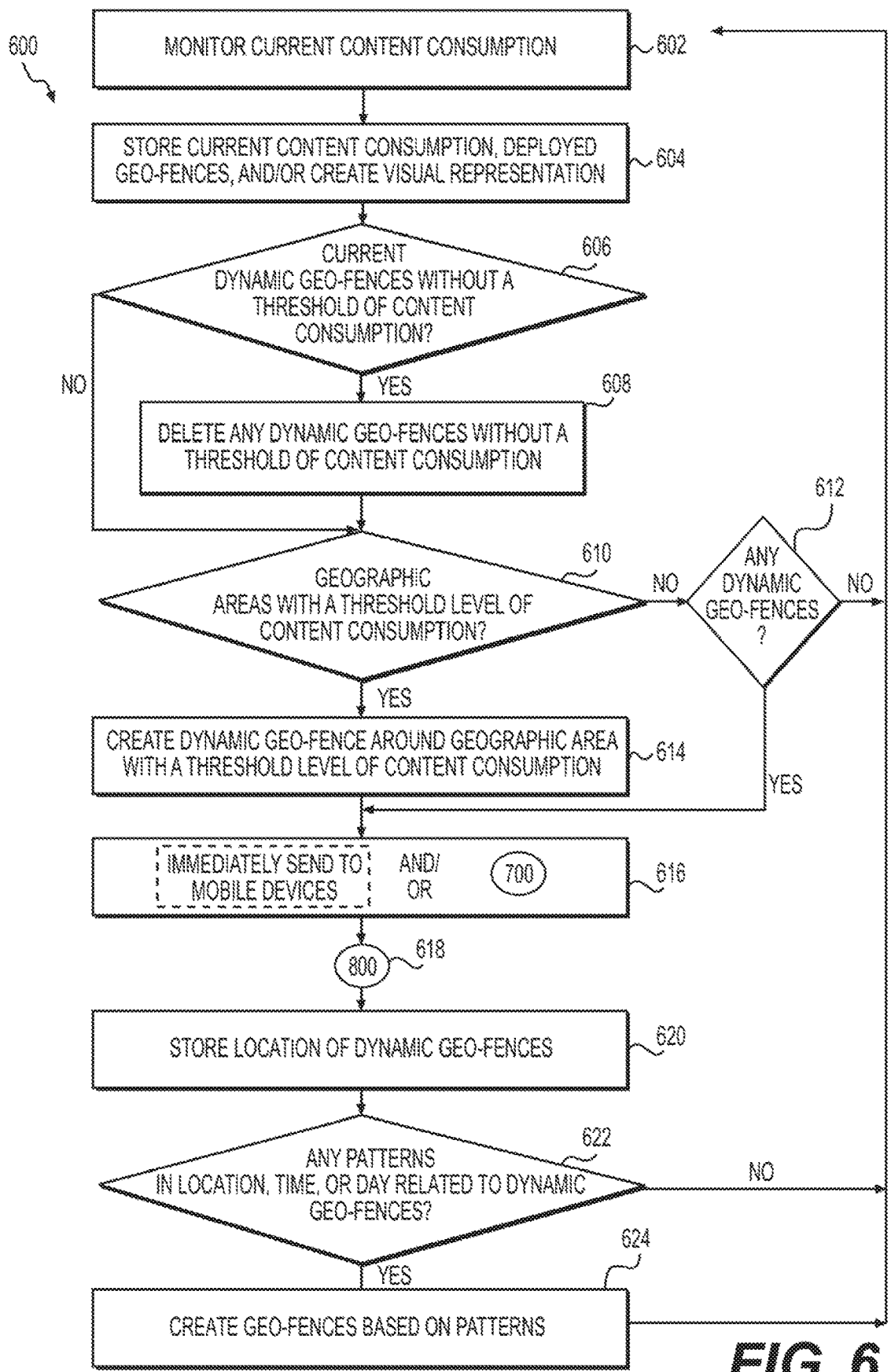
FIG. 6 is a process flow diagram of an exemplary method for determining in real-time geographic areas having a threshold level of content consumption and deploying dynamic geo-fences around those areas.

FIG. 1B depicts map 100 of FIG. 1A after completion of step 305 of FIG. 3 and/or step 614 of FIG. 6. FIG. 1B depicts the monitored content consumption, exemplary means of determining whether any geographic areas currently have a threshold level of content consumption, and the geographic bounds of dynamic geo-fences created to cover geographic areas with a threshold level of content consumption. It should be appreciated that content consumption may be determined and measured in any way, including but not limited to, amount of content creation, the number of opened or executed client applications, the number of people using their phones for any task, the number of new pages requested by mobile devices, the number of launched web browsers, the number of ad requests from application or browsers, input and/or touch frequency, number of consumers commenting, tweeting, posting to websites and/or apps, number of comments, tweets, or posts, the number of people using their phones for any task, the number of launched web browsers, the number of ad requests from application or browsers, or any combinations thereof. This may be determined by a current consumption server. It should also be appreciated that the terms current, real-time, or recent may encompass any amount of time suitable. For example, current mobile phone use for a geographic location may be use monitored within the last second or within the last year.

In one embodiment, a grid system as shown in the lower left corner of FIG. 1B may be set up to determine which geographic areas currently have a threshold level of content consumption. Here, each grid may represent a certain area, for example, 1 mile by 1 mile or 5 blocks by 3 blocks. If a specific area currently has a threshold level of content consumption, for example twenty client applications open within 50 $m^2$, a dynamic geo-fence may be created to contain this area. Further, if adjacent squares of the grids currently have a threshold level of content consumption, a dynamic geo-fence may be created that contains all the adjacent squares, like geo-fenced area 102.

In another embodiment, the geographic area currently with a threshold level of content consumption and the resulting dynamic geo-fence may take any shape based on density. As shown in FIG. 1B, map 100 includes a geo-fenced area 104, which may take any shape based on the shape of the geographic area currently with a threshold level of content consumption.

Alternatively or additionally, the boundaries or dimensions of each of the geo-fenced areas 102 and 104 may correspond to, for example, the shape and size of a building or other physical structure defined in a database. For example, the current content consumption may be at a threshold level within a section, but not all of a known structure, such as Fenway Park. Rather than creating a dynamic geo-fence to cover just the geographic area currently with a threshold level of content consumption, the database of known structures can be utilized to create a dynamic geo-fence over the entirety of the known structure, e.g. Fenway Park, or the park and its parking lots.

In one example, the area may be a professional sporting event at half time with content consumption that is currently above a threshold level and located within geo-fenced area 102. In another example, the area may be outside of a business in the hours before a large sale (e.g. Black Friday). These areas would not traditionally have a threshold level of content consumption, but as consumers wait in line for the sale or spectators wait at half time for the game to start again, they may be bored and as a result, be more likely to launch a client application. In such a situation, a level of content consumption of mobile device users in the area could be observed and tracked, and geo-fence 102 and geo-fence 104 could be created in real-time around the geographic areas having a threshold level of content consumption. However, it should be noted that geo-fenced areas 102 or 104 may be of any size and shape. The size and shape of each geo-fenced area may also be based on the exact geographic limitations of the area currently with a threshold level of content consumption and/or a certain radius around a geographic area currently with high consumption.

In some embodiments, a dynamic geo-fence may have been previously created, but may no longer have a threshold level of content consumption, like geo-fenced area 106 in FIG. 1A. When this is the case, the dynamic geo-fence covering geo-fenced area 106 may deleted, as shown in FIG. 1B. Further, in some embodiments, a dynamic geo-fence that was previously created may currently be too large and cover more than the current geographic area with a threshold level of content consumption or too small. If the dynamic geo-fence is too large, its size may be decreased. If a dynamic geo-fence is too small, its size may be increased to contain the entire geographic area currently with a threshold level of the content consumption. When there is a previously created dynamic geo-fence, the above referenced adjustments or deletions may occur at any point, including, but not limited to, after a set period of time, after a set number of times the geographic area containing the dynamic geo-fence is monitored, immediately after a change in the content consumption is detected, and/or a set period of time after a change in content consumption is detected and remains in the new state.

Each of user devices 110a, 110b, and 110c may be configured to execute one or more client applications. Such a client application executable at each of user devices 110a, 110b, and 110c may be associated with, for example, an information service provider. Further, each of user devices 110a, 110b, and 110c may be configured to receive message notifications related to topics of interest (e.g., breaking news alerts) for a user at each device. As will be described in further detail below, such notifications may be sent to each of user devices 110a, 110b, and 110c by a message server via a mobile communications network. The message notifications may be sent by the message server as, for example, push notifications that are periodically sent to each device. However, it should be noted that the techniques disclosed herein are not limited to push notifications and that these techniques may be applied with any type of messaging scheme or protocol used to deliver message notifications to user devices 110a, 110b, and 110c. For example, any of user devices 110a, 110b, or 110c may be configured to request (or "pull") pending notification messages from the message server via the mobile communication network.

As described above, the message notifications delivered to any of user devices 110a, 110b, or 110c for a particular client application executable at the device may be displayed within, for example, a general notifications window or similar type of user control element of a GUI provided by a mobile operating system at the device, particularly when the client application has not been opened or launched by the user and thus, the client application is not actively executing at the user's device. Also, as described above, the user of each device may have subscribed to a service offered by an application service provider associated with a client application executable at the user's device, which authorizes the application service provider to send relevant message notifications (e.g., as push notifications) to the user's device.

While a particular client application may be associated with a service provider that is unrelated to any of the third-party content providers, the application service provider may have authorized each third-party content provider to provide targeted content for display within a designated portion of the client application's GUI as it executes at the device. Such authorization may be pursuant to, for example, a partnership or advertising agreement between the application service provider and the third-party content provider. Accordingly, the third-party content may provide targeted content to user device 110a via a mobile communication network, when the geographic location of mobile device 110a is determined to be within geo-fenced area 102 and an eligible client application, e.g., which may be associated with a service provider with whom the third-party content provider has a partnership agreement in place, is actively executing at user device 110a. Similarly, targeted content may be provided to an appropriate client application executing at user device 110c, when user device 110b is determined to be within geo-fenced area 104.

In an example, a user of a client application executable at user device 110a may have subscribed to a messaging service provided by an application service provider associated with the client application in order to receive push notifications related to topics or events of interest to the user. Such a messaging service may be hosted at a message server associated with the client application or application service provider. Additional details of such a message server will be described in further detail below in reference to FIGS. 2-5. Examples of different push notifications that may be sent for the user at user device 110a include, but are not limited to, news alerts related to topics or keywords previously specified by the user, system or service-related message notifications, public safety advisories, and notifications of comments or messages posted to an electronic message board by other users (e.g., members of a social networking group associated with the user of user device 110a). The push notifications may be periodically sent by, for example, a messaging service of the application service provider to user device 110a via a mobile communication network. The notifications received at user device 110a may be displayed in a general notifications window of a GUI provided by the operating system of user device 110a.

The current geographic location of user device 110c of FIG. 1B may not be within a geographic area having a threshold level of content consumption, e.g., corresponding to either of geo-fenced areas 102 or 104. Thus, upon determining that user device 110c is not currently located within a dynamic geo-fence, the above-described messaging service provided by the application service provider may add a new message to be sent (or pushed) as a notification to user device 110c to a message queue maintained by the message server. The current location of user device may be forwarded to the consumption tracking server by an application server or message server associated with the application service provider In some implementations, a message or message notification that may be added to the message queue may be associated with an expiration time that may be used to determine the period of time that the message will be kept in the queue before being delivered to user device 110c, regardless of the device's current geographic location. The expiration time associated with a queued message may be based on, for example, a predetermined time period that reflects a priority level assigned to the particular message notification. For example, an important public advisory message or breaking news alert may be assigned a relatively high priority level, and therefore, be associated with a relatively short expiration time. Thus, such high priority message notifications may be kept in the queue for a relatively short time period or alternatively, be sent immediately to user device 110c, without being added to the message queue.

In the above example, user device 110c may be configured to periodically report its current geographic location to the application or message server as this location changes over a period of time. As will be described in further detail below, upon receiving an indication of a new or updated current geographic location of user device 110c, the message server may query the application server or message server to determine whether the updated geographic location is within a dynamic geo-fence.

If it is determined that the updated geographic location of user device 110c is within a dynamic geo-fence, e.g., within geo-fenced area 102 or geo-fenced area 104, the message server may check the message queue for any previously queued messages. The message server may then send a message notification from the message queue to user device 110c, upon finding at least one message in the message queue.

In one example, once it is determined that a user device 110a, 110b, or 110c is within a dynamic geo-fence, the message server may further query the content server to determine if the user device is also located within a geo-fence associated with targeted content. For example, if geo-fence 104 is also associated with a third-party content provider, the content server provides the application server with the targeted content associated with geo-fence 104. If geo-fence 104 is not determined to be associated with a third-party content provider or targeted content, the content server provides the application server with any targeted content, regardless of the content's geographic association.

Figure 2:
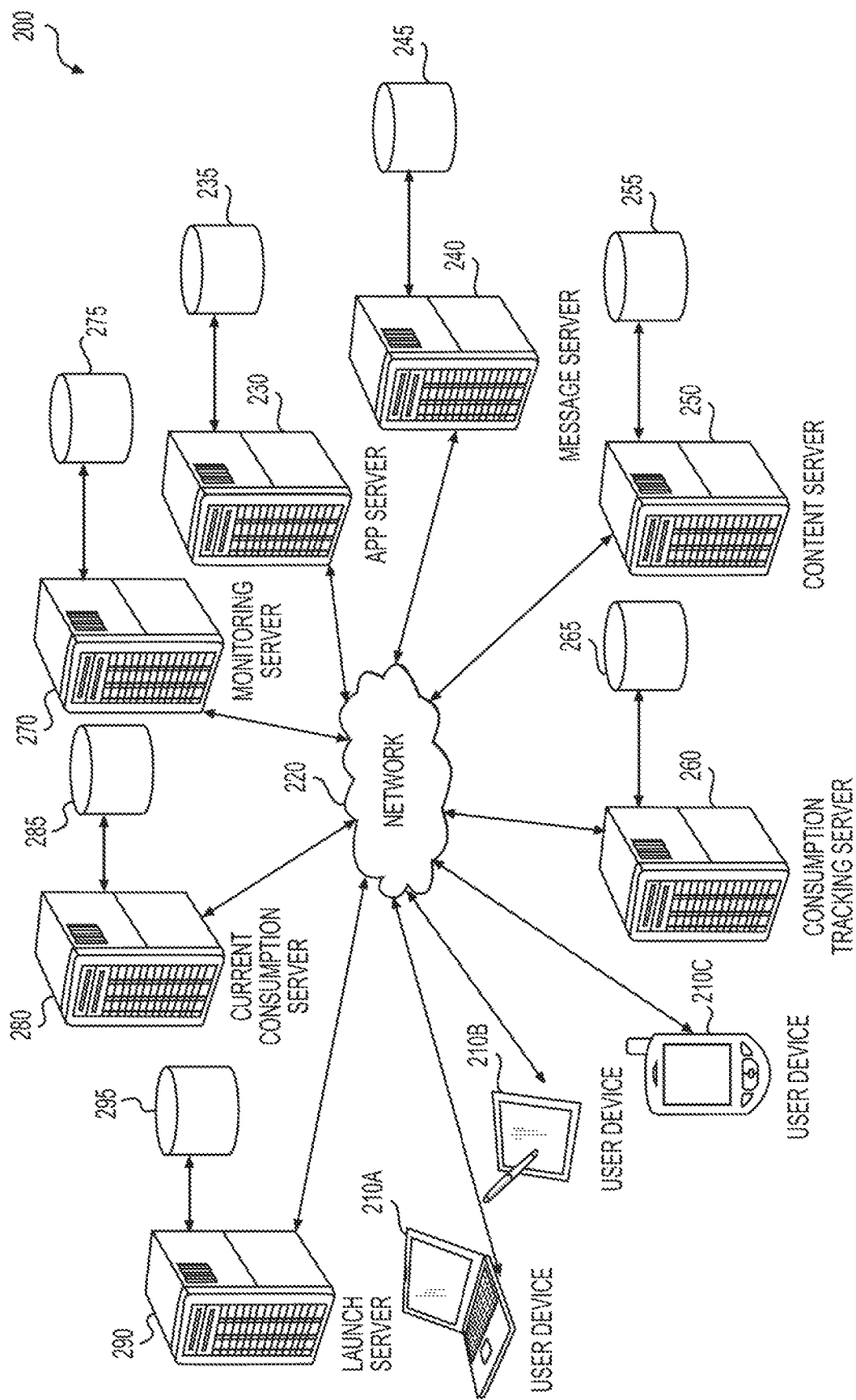
FIG. 2 is a block diagram of an exemplary communication system suitable for practicing an embodiment of the present disclosure.

FIG. 2 is a block diagram of an exemplary communication system 200 for practicing embodiments of the present disclosure. As shown in FIG. 2, system 200 includes user devices 210a, 210b, and 210c, an application server 230 coupled to a database 235, a message server 240 coupled to a database 245, a content server 250 coupled to a database 255, a consumption tracking server 260 coupled to a database 265, a monitoring server 270 coupled to a database 275, a current consumption server 280 coupled to a database 285, and a launch server 290 coupled to a database 295, all of which may be communicatively coupled via an electronic communication network 220.

Network 220 may be any type of electronic network or combination of networks used for communicating digital content and data between various computing devices. Network 220 may include, for example, a local area network, a medium area network, or a wide area network, such as the Internet. While only user devices 210a, 210b, and 210c are shown in FIG. 2, system 200 may include any number of user devices. Similarly, while only application server 230, message server 240, content server 250, consumption tracking server 260, monitoring server 270, a current consumption server 280, and a launch server 290 are shown in FIG. 2, it should be understood that system 200 may include additional or fewer servers, as desired for a particular implementation. Further, while not shown in FIG. 2, network 220 may include various switches, routers, gateways, or other types of network devices used to facilitate communication between various computing devices via network 220.

In the example shown in FIG. 2, user device 210a may be a laptop, notebook, netbook, or similar type of mobile computing device. User device 210b may be, for example, a tablet device or similar type of mobile device having a touchscreen display. User device 210c may be, for example, a mobile handset, smartphone, or personal digital assistant ("PDA"). However, it should be noted that each of user devices 210a, 210b, and 210c may be any type of mobile computing device configured to send and receive different types of data including, but not limited to, website data, multimedia content, electronic advertisements, and any other type of digital information, over network 220. Examples of such mobile computing devices include, but are not limited to, a laptop computer, a handheld computer, a personal digital assistant (PDA), a cellular telephone, a network appliance, a camera, a smart phone, an enhanced general packet radio service (EGPRS) mobile phone, a media player, a navigation device, a portable game console, or any combination of these computing devices or other types of mobile computing devices having at least one processor, a local memory, a display, one or more user input devices, and a network communication interface. The user input device(s) may include any type or combination of input/output devices, such as a display monitor, touchpad, touchscreen, microphone, camera, keyboard, and/or mouse.

Each of application server 230, message server 240, content server 250, consumption tracking server 260, monitoring server 270, current consumption server 280, and launch server 290 may be any of various types of servers including, but not limited to, a web server, a proxy server, a network server, or other type of server configured to exchange electronic information with other servers or computing devices via a communication network, e.g., network 220. Such a server may be implemented using any general-purpose computer capable of serving data to other computing devices including, but not limited to, user devices 210a, 210b, and 210c or any other computing device (not shown) via network 220. Such a server may include, for example and without limitation, a processor and memory for executing and storing processor-readable instructions. The memory may include any type of random access memory (RAM) or read-only memory (ROM) embodied in a physical storage medium, such as magnetic storage including floppy disk, hard disk, or magnetic tape; semiconductor storage such as solid state disk (SSD) or flash memory; optical disc storage; or magneto-optical disc storage. Software may include one or more applications and an operating system. Hardware can include, but is not limited to, a processor, memory and graphical user interface display. The server may also be implemented using multiple processors and multiple shared or separate memory devices within, for example, a clustered computing environment or server farm.

Also, as shown in FIG. 2, application server 230, message server 240, content server 250, consumption tracking server 260, monitoring server 270, current consumption server 280, and launch server 290 may be communicatively coupled to databases 235, 245, 255, 265, 275, 285, and 295 respectively. Each of databases 235, 245, 255, 265, 275, 285, and 295 may be a data store or memory accessible to the corresponding server and may be implemented using any type of data storage device or recording medium used to store various kinds of data or content. Such data or content may include, for example and without limitation, text or media content that may be later provided to each of user devices 210a, 210b, and 210c via network 220.

In an example, each of user devices 210a, 210b, and 210c may execute a client application that communicates with application server 230, message server 240, content server 250, consumption tracking server 260, monitoring server 270, current consumption server 280, and/or launch server 290 via network 220. Further, each of user devices 210a, 210b and 210c may be configured to receive application content through an interface provided by application server 230 via network 220. The content provided by application server 230 may be based on, for example, user requests initiated via a GUI of the client application executable at each device. The GUI of the client application executable at each of user devices 210a, 210b, and 210c may be configured to present the content to a user at each device via a display of the respective user devices 210a, 210b, and 210c. The GUI of the client application may include, for example, various control elements enabling the user to request various types of content, e.g., which may be associated with a web site maintained by the application service provider. Further, a portion of the GUI of the client application may serve as a content viewing area used to display content (e.g., electronic advertisements) from a third-party content provider associated with content server 250. Such a content view of the client application may be a dedicated content area, e.g., displayed at the very top or bottom portion, of the application's GUI. As described above, such third-party content, e.g., as provided by content server 250 via network 220, may be displayed within the content view of the client application when the client application is actively executing at user device 210a, 210b, or 210c. Also, as described above, such third-party content may be different from the messages sent by an application provider for display to the user via a general message notifications interface of the operating system at user device 210a, 210b, or 210c, even when the client application is dormant or not actively executing at the particular device.

Application server 230 may be configured to host a web service that provides users various types of functionality via a GUI of the client application executable at each of user devices 210a, 210b, and 210c. Such functionality may include, for example and without limitation, providing digital content distributed by an application service provider associated with the client application. The application service provider may be, for example, an online content provider, including those associated with various search engines, e-mail programs, RSS feed providers, magazines, e-zines, blogs, or any other online site or program that publishes or distributes online content related to, for example, news or various topics of general public interest. As described above, a functionality provided by such an application service provider may include sending messages, e.g., push notifications, related to topics of interest, as specified by a user/subscriber of each user device. Also, as described above, the messages sent to each device may be displayed for the user via a message notifications interface of a mobile operating system at each of user devices 210a, 210b, and 210c if, for example, the client application has not been launched by the user or is not actively executing at the user's device.

Further, application server 230 and message server 240 may be configured to communicate with content server 250 or one or more other third-party content servers (not shown) to retrieve content (e.g., electronic advertisements) via network 220 to be displayed within a content view of a client application executable at each of user devices 210a, 210b, and 210c. Further, application server 230, message server 240, content server 250, consumption tracking server 260, monitoring server 270, current consumption server 280, and launch server 290 may each interact with one another, user devices 210a, 210b, or 210c, or any other servers or network devices (not shown) via network 220. Examples of such other servers include, but are not limited to, DNS servers, ad servers, and content distribution servers.

Message server 240 in this example may be configured to control the timing of messages or push notifications to be sent via network 220 to each of user devices 210a, 210b, and 210c based on the current geographic location of each device relative to one or more dynamic geo-fences, e.g., geo-fenced areas 102 and 104, as described above. In an example, message server 240 may delay the sending of a message when the current geographic location of the device is determined not to be located within at least one of these dynamic geo-fences. As will be described in further detail below, message server 240 may add the message to a message queue for the client application. Message server 240 may be configured to send the message from the message queue to user device 210a, 210b, or 210c via network 220, upon receiving an indication of an updated current geographic location of the device and determining that the new or updated location corresponds to a dynamic geo-fence.

In an example, message server 240 may communicate with content server 250 to determine whether the current geographic location of user device 210a, 210b, or 210c is within a geo-fence associated with targeted content, as described above and as will be described in further detail below. Content server 250 may be configured to receive a request including the current geographic location of user device 210a, 210b, or 210c from message server 240 and send appropriate targeted content to message server 240 after determining whether the received geographic location corresponds to a geo-fence associated with targeted content.

In some implementations, message server 240 may be implemented as a back-end component that interfaces with only application server 230, content server 250, and consumption tracking server 260. Thus, it should be noted that for some implementations, message server 240 may be configured to act as an intermediary between application server 230 and content server 250 or application server 230 and consumption tracking server 260, without any direct communication with any of user devices 210a, 210b, or 210c, in order to facilitate the message notification timing functionality described herein. Accordingly, application server 230, message server 240, content server 250, and consumption tracking server 260 may be configured to exchange information in the form of messages, requests, or responses that are passed between the servers. The communication between application server 230, message server 240, content server 250, and consumption tracking server 260 may be over network 220 or a virtual private network accessible to each server. In an example, messages added to the message queue may be routed from message server 240 to application server 230, when it is determined that user device 210a, 210b, or 210c is located within a geographic area having a threshold level of content consumption area. Application server 230 may then send the routed message to user device 210a, 210b, or 210c via network 220. However, it should be noted that the functions performed by application server 230, message server 240, content server 250, consumption tracking server 260, or any combination thereof, as described herein, may be implemented using a single server. Additional features and characteristics of the communication between user devices 210a, 210b, and 210c, application server 230, message server 240, content server 250, and consumption tracking server 260 will be described in further detail below with respect to FIGS. 3, 4, and 5.

FIG. 3 is a communication flow diagram of an exemplary process 300 for monitoring mobile device traffic and optimizing the size and location of geo-fences based on current mobile device traffic and/or current content consumption. The example shown in FIG. 3 illustrates the communication flow between a user device 310, a monitoring server 370, a current consumption server 380, and a launch server 390. For purposes of discussion, process 300 will be described using map 100 of FIG. 1B and system 200 of FIG. 2, as described above, but process 300 is not intended to be limited thereto. Thus, user device 310 may be implemented using, for example, any of user devices 210a, 210b, or 210c of FIG. 2, as described above. Similarly, monitoring server 370, current consumption server 380, and launch server 390 may be implemented using, for example, monitoring server 270, current consumption server 280, and launch server 290, respectively, as described above.

As shown in FIG. 3, monitoring server 370 may monitor and store the current mobile device traffic and/or content consumption (step 301). This may be monitored on a variety of levels, for example, worldwide, on a provider basis, and/or in a limited geographic area. The information may be collected by monitoring server 370 itself, provided by an external server, and/or a compilation of several sources. Once the monitoring server 370 obtains the current traffic and/or content consumption, this information may be stored in a memory or data store (e.g., database 275 of FIG. 2, as described above) coupled to application server 370. The current traffic may be stored, for example, as a table, numerical representations, or as a geographic map. The information stored in database 275 may include any information related to the current mobile device landscape, including, but not limited to, the time of day, volume of mobile devices or data usage, whether any geo-fences are currently present, what each present geo-fence represents (i.e., a geographic area associated with a threshold level of content consumption, a previously deployed dynamic geo-fence, or a geo-fence associated with targeted content.) Once monitoring server 370 monitors the current content consumption, monitoring server 370 may send the current mobile device landscape either all monitored information or just a part of it to current consumption server 380 via a communication network, e.g., network 220 of FIG. 2 (step 302). Current consumption server 380 may then determine if there are any geographic areas not currently covered by a geo-fence based on current content consumption (i.e., a geo-fence based on historic content consumption above a threshold and/or a previously deployed dynamic geo-fence), which currently have a threshold level of content consumption. Current consumption server 380 may also determine if there are any previously created, dynamic geo-fences that no longer have a threshold level of content consumption, that have been deployed for more than a set period of time, and/or that have not had a threshold level for a set period of time. The information related to which areas are or are not, currently covered by a geo-fence based on content consumption may be obtained by the current consumption server 380, either by receipt from monitoring server 370 or by being stored in a memory or data store (e.g., database 285 of FIG. 2, as described above) coupled to current consumption server 380. If, in step 303, the current consumption server 380 determines that there is a geographic location currently with a threshold level of content consumption, the current consumption server 380 may send the geographic location to the launch server 390 via a communication network, e.g., network 220 of FIG. 2 (step 304). The launch server 390 may then create a geo-fence around the geographic area(s) currently with a threshold level of content consumption as provided by the current consumption server 380 (step 305). When these dynamic geo-fences have been created by launch server 390, message notifications may be sent to mobile devices within these geo-fences immediately or in the manner described below in FIG. 4. The launch server 390 may then send to the monitoring server 370 information related to the dynamic geo-fences, including but not limited to, the time of deployment, time of message notification to the mobile devices in the dynamic geo-fence, size, shape and/or geo-graphic location of the dynamic geo-fence. After a designated period of time from creating a dynamic geo-fence or from when a message notification may have been sent to the mobile devices within a dynamic geo-fence, the monitoring server 370 may monitor the number of mobile devices that launched the client application associated with the mobile notification (and/or, depending on the desired statistics, monitor any other measurement of content consumption within the dynamic geo-fence to determine whether there has been an increase). This new data may include, but is not limited to, current content consumption, the difference between the current content consumption and the content consumption before the dynamic geo-fence was created, and/or the number of mobile devices that launch the client application after the dynamic geo-fence was created.

Figure 4:
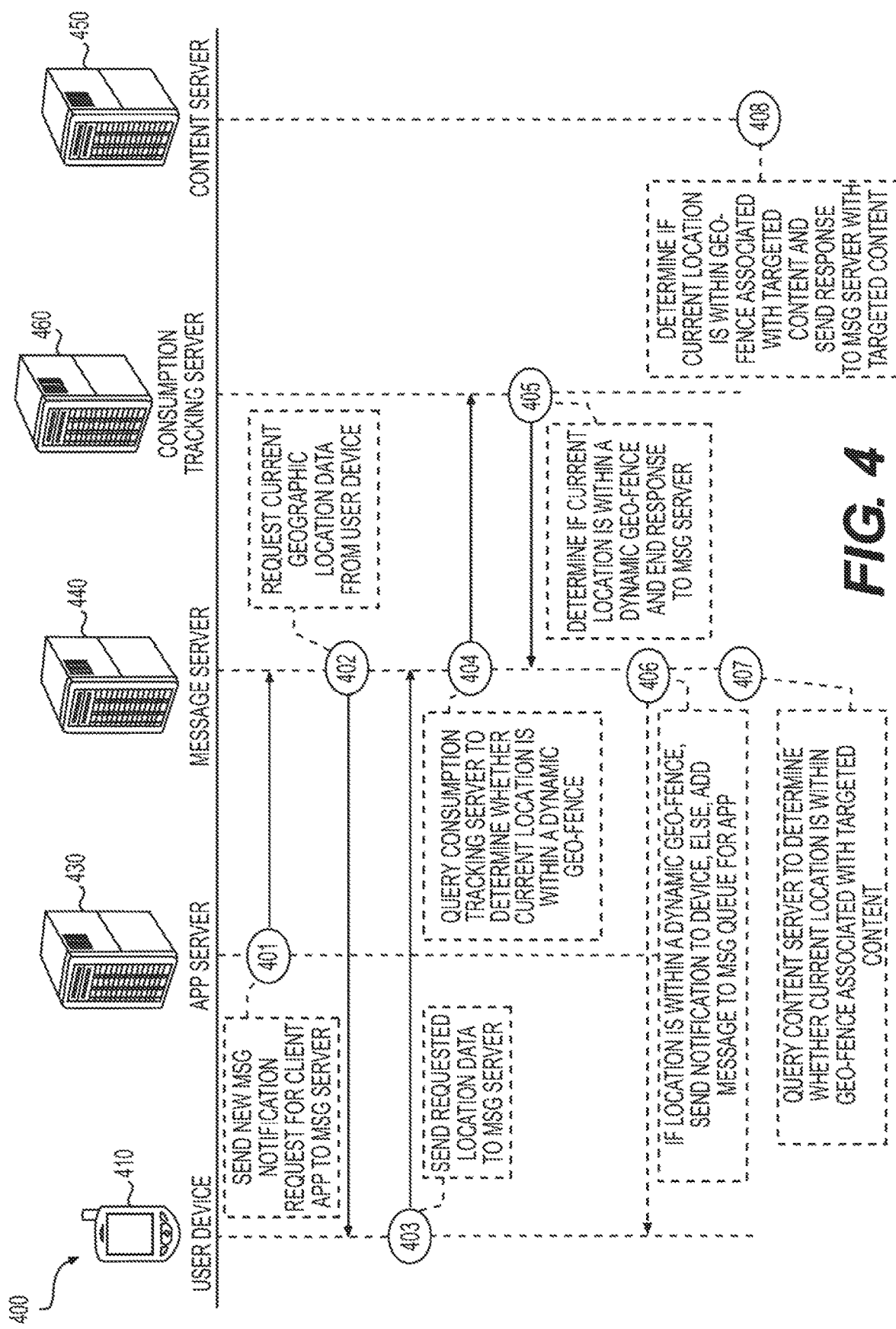
FIG. 4 is a communication flow diagram of an exemplary process for optimizing the timing of message notifications for a mobile device user based on a current geographic location of the user's device relative to a dynamic geo-fence.

FIG. 4 is a communication flow diagram of an exemplary process 400 for optimizing the timing of message notifications for a mobile device user based on a current geographic location of the user's device relative to geographic areas having a threshold level of content consumption, as described above. The example shown in FIG. 4 illustrates the communication flow between a user device 410, an application server 430, a message server 440, a content server 450, and a consumption tracking server 460. For purposes of discussion, process 400 will be described using map 100 of FIG. 1B and system 200 of FIG. 2, as described above, but process 400 is not intended to be limited thereto. Thus, user device 410 may be implemented using, for example, any of user devices 210a, 210b, or 210c of FIG. 2, as described above. Similarly, application server 430, message server 440, content server 450, and consumption tracking server 360 may be implemented using, for example, application server 230, message server 240, content server 250, and consumption tracking server 260, respectively, as described above.

As shown in FIG. 4, application server 430 may send a new message notification request for a client application executable at user device 410 to message server 440 via a communication network, e.g., network 220 of FIG. 2, as described above (step 401). Message server 440 may in turn request a current geographic location of user device 410 (step 402). The request may be sent by message server 440 directly to user device 410, as shown in FIG. 4, or alternatively, message server 440 may send the request to application server 430, which may then request the geographic location information from user device 410, if necessary. In some implementations, application server 430 may respond to the request from message server 440 by sending a last known or previously determined or estimated geographic location of user device 410, e.g., which may be stored in a memory or data store (e.g., database 235 of FIG. 2, as described above) coupled to application server 430. Accordingly, user device 410 may send the requested location data (or current geographic location information) to message server 440 (step 403), or to whichever server (e.g., application server 430) may have requested the information from user device 410.

Message server 440 may be configured to query consumption tracking server 460 to determine whether the current geographic location of user device 410 is within a dynamic geo-fence, as described above (step 404). If the current geographic location of user device 410 is determined (e.g., by app server 430) to be within a dynamic geo-fence, message server 440 may send the message notification to user device 410 for display to the user at user device 410 via a general notifications interface of the operating system of user device 410, as described previously (step 406). Alternatively, if the device's location is determined not to be within a dynamic geo-fence, the message may be added to a message queue to be sent at a later time, as described above.

In other implementations, the determination of whether the device's location corresponds to a dynamic geo-fence may be performed by message server 440 itself, e.g., based on information specifying one or more dynamic geo-fences. Such information may be stored within a memory or data store (e.g., database 245 of FIG. 2) coupled to message server 440, as described above.

It should be noted that in some implementations, the message server 440 can also query the content server 450 (step 407) to determine whether the device's location corresponds to a geo-fence associated with targeted content. If the current geographic location of user device 410 is determined (e.g., by content server 450) to be within a geo-fence associated with targeted content, content server 450 may provide the application server 430 with targeted content associated with that geo-fence to be displayed in the client application after said application has launched (step 409).

Figure 5:
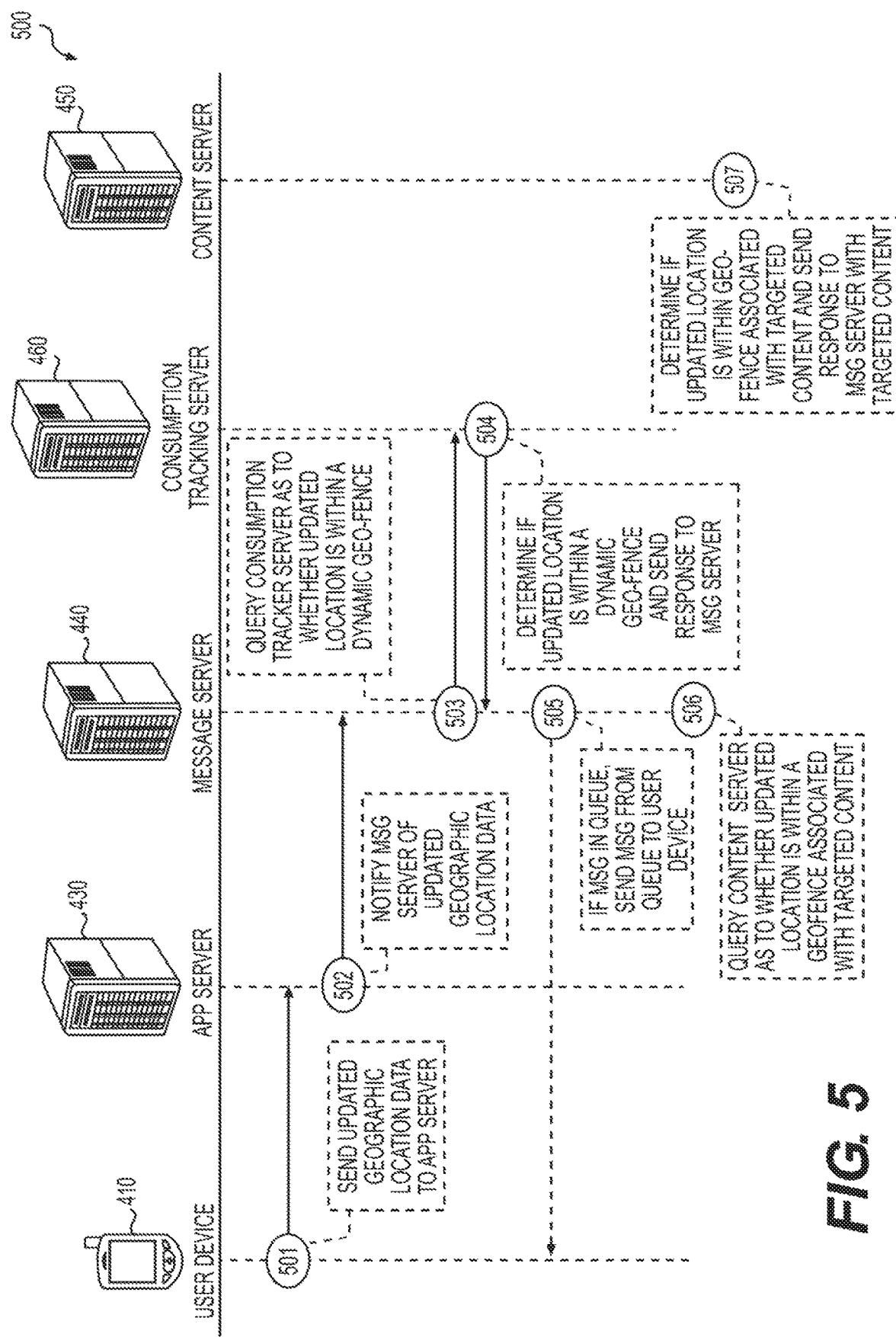
FIG. 5 is a communication flow diagram of an exemplary process for optimizing the timing of message notifications for the mobile device user of FIG. 4 based on a detected change in the current geographic location of the user's device relative to a dynamic geo-fence.

FIG. 5 is a communication flow diagram of an exemplary process 500 for optimizing the timing of message notifications for the user of mobile device 410 of FIG. 4, as described above, based on a detected change in the current geographic location of the user's device relative to a dynamic geo-fence. As shown in FIG. 5, the detected change in location may be based on, for example, an updated current geographic location sent by user device 410 or an operating system thereof to application server 430 via a network, e.g., network 220 of FIG. 2, as described above (step 501).

Application server 430 may then notify message server 440 of the updated geographic location information received from user device 410 (step 502). In response to the notification from application server 430, message server 440 may query consumption tracking server 460 as to whether the updated current location of user device 410 is within a dynamic geo-fence (step 503). The results of the determination may be sent in a response from geo-fence server 460 to message server 440 (step 504). If the response from consumption tracking server 460 indicates that the updated location is within a dynamic geo-fence, message server 440 may check the message queue to determine if there are any pending message notifications within the queue that need to be sent to user device 410, e.g., as added previously by message server 440 (at step 406 of process 400 of FIG. 4, as described above). Message server 440 may send the message to user device 410 via a communication network, e.g., network 220 of FIG. 2 (step 505), only if a message is found within the message queue or do nothing otherwise.

If message server 440 in this example finds multiple messages within the message queue for the client application, message server 440 may be configured to select the appropriate message to send to user device 410 using any one of various priority schemes as desired for a particular implementation. Examples of such priority schemes include, but are not limited to, first-in-first-out (FIFO), last-in-first-out (LIFO), or an alternative scheme based on message priority. In an example, the priority scheme may be based on an expiration time associated with each message added to the message queue. The expiration time may be used to determine the maximum period of time that a message should be held in the message queue prior to being delivered to user device 410. In some implementations, the expiration time may reflect a priority level assigned to the message, e.g., by the application service provider associated with the client application, as described above.

The message server 440 may also query the content server 450 as to whether the updated current location of user device 410 is within a geo-fence associated with targeted content (step 506). The results of the determination may be sent in a response from content server 450 to message server 440 (step 507). If the response from content server 450 indicates that the updated location is within a geo-fence associated with targeted content, the content server 450 can provide or the message server 440 may query the content server 450 for targeted content associated with the geo-fenced area. Content server 450 may send the targeted content to the application server 430 for delivery within any launched client application. If the response from content server 450 indicates that the updated location is not within a geo-fence associated with targeted content, the content server 450 provides any targeted content, regardless of its geographic association to application server 330 for delivery within any launched application.

FIG. 6 is a process flow diagram of an exemplary method 600 for monitoring mobile device traffic and defining a dynamic geo-fence. For purposes of discussion, method 600 will be described using system 200 of FIG. 2 and the components of processes 300, 400, and 500 of FIGS. 3, 4, and 5 (including application server 430, message server 440, content server 450, consumption tracking server 460, monitoring server 370, current consumption server 380, and launch server 390), as described above, but method 600 is not intended to be limited thereto. As shown in FIG. 6, method 600 includes steps 602, 604, 606, 608, 610, 612, 614, 616, 618, 620, 622, and 624. However, it should be noted that method 600 may include more or fewer steps as desired for a particular implementation. In an example, one or more of the above-listed steps of method 600 may be executed by application server 230, message server 240, content server 250, consumption tracking server 260, monitoring server 270, current consumption server 280, and launch server 290 of FIG. 2, as described above. However, method 600 is not intended to be limited thereto, and the steps of method 600 may be performed by any server or other type of computing device having at least one processor, a memory, and a network communication interface for sending and receiving information from one or more user devices.

Method 600 begins in step 602, which includes monitoring user mobile device content consumption for specific geographic locations. This step may monitor traffic and/or content consumption in any way, including those described above for FIG. 1B. In step 604, the current content consumption and the all current geo-fences are stored in a database. In some implementations, step 604 may include creating a visual representation of the current and/or trends in content consumption (e.g. a map of "hotspots") and current or historic geo-fences. Exemplary embodiments of these visual representations include FIGS. 1A-B. Step 606 may include, for example, determining whether any current dynamic geo-fences not experiencing a threshold level of content consumption. The step of determining whether any current dynamic geo-fences not experiencing a threshold level of content consumption may be done for a specific moment of monitoring, if content consumption is below the threshold for a certain number of iterations of step 606, or if content consumption is below the threshold for a certain period of time. In some implementations, this determination may be based on a response received from querying a server (e.g., current consumption server 280 of FIG. 2 or current consumption server 380 of FIG. 3) using the content consumption data received from a separate server (e.g., monitoring server 270 of FIG. 2 or monitoring server 370 of FIG. 3). If it is determined in step 606 that there are any dynamic geo-fences not experiencing a threshold level of content consumption, (step 606: Yes), method 600 may proceed to step 608, which includes deleting any dynamic geo-fences not experiencing a threshold level of current content consumption. Once all dynamic geo-fences without a threshold level of current content consumption are deleted or if it is determined in step 606 that there are no dynamic geo-fences without a threshold level of current content consumption (step 606: No), method 600 may proceed to step 610.

Step 610 may include, for example, determining whether any geographic areas currently have a threshold level of content consumption. In some implementations, this determination may be based on a response received from querying a server (e.g., current consumption server 280 of FIG. 2 or current consumption server 380 of FIG. 3) using the content consumption data received from a separate server (e.g., monitoring server 270 of FIG. 2 or monitoring server 370 of FIG. 3). If it is determined in step 610 that a geographic area (not completely covered by a previously created geo-fence based on content consumption, whether permanent, historic, or dynamic) is having a threshold level of content consumption, (step 610: Yes), method 600 may proceed to step 614, which includes creating a dynamic geo-fence around the geographic area having a threshold level of content consumption. Once dynamic geo-fences are created around all geographic areas having a threshold level of content consumption (as determined in step 610), method 600 may proceed to step 616. It should be noted that in certain embodiments, steps 606 and 608 may also determine if a previously created dynamic geo-fence covers more than the geographic area having a threshold level of content consumption and then reduce the size of the dynamic geo-fence. Similarly, steps 610 and 614 may determine whether a previously created dynamic geo-fence (or a preset geo-fence) is not large enough to cover the entire geographic area having a threshold level of content consumption and then increase the size.

If it is determined that there are no geographic areas (not already covered by a geo-fence based on content consumption) having a threshold level of content consumption, method 600 may proceed to step 612, which determines whether there are any geo-fences based on content consumption currently in the geographic area targeted in method 600 (e.g., the world, a specific country/state/city/neighborhood). If it is determined that there are geo-fences based on content consumption in the targeted geographic area (step 612: Yes), method 600 proceeds to step 616. If it is determined that there are no geo-fences based on content consumption in the targeted geographic area (step 612: No), method 600 returns to step 602.

In step 616, a message may be immediately sent to all mobile devices previously and/or currently monitored in dynamic geo-fences and/or method 600 may proceed to step 702 of method 700.

Once step 616 is complete, method 700 proceeds to method 800. Once method 800 is complete (as described below), method 600 proceeds to step 620. In step 620, the information related to monitored content consumption, the location of the geo-fences based on content consumption, and/or the success rate of the dynamic geo-fences may be stored in a database and/or visual represented in, for example, a map similar to FIGS. 1A-B. After this data is stored, method 600 proceeds to step 622 which may involve reviewing the data and determining if there are any patterns related to day/time/etc. with respect to when and where the dynamic geo-fences are created. If it is determined in step 622 that patterns exist, then method 600 may proceed to step 626. In step 626, "historic" geo-fences may be created based on detected patterns and may be utilized in the manner described in U.S. patent application Ser. No. 14/194,108 filed Feb. 28, 2014. After detecting any patterns and creating geo-fences based on historic content consumption, method 600 will return to step 602.

Figure 7:
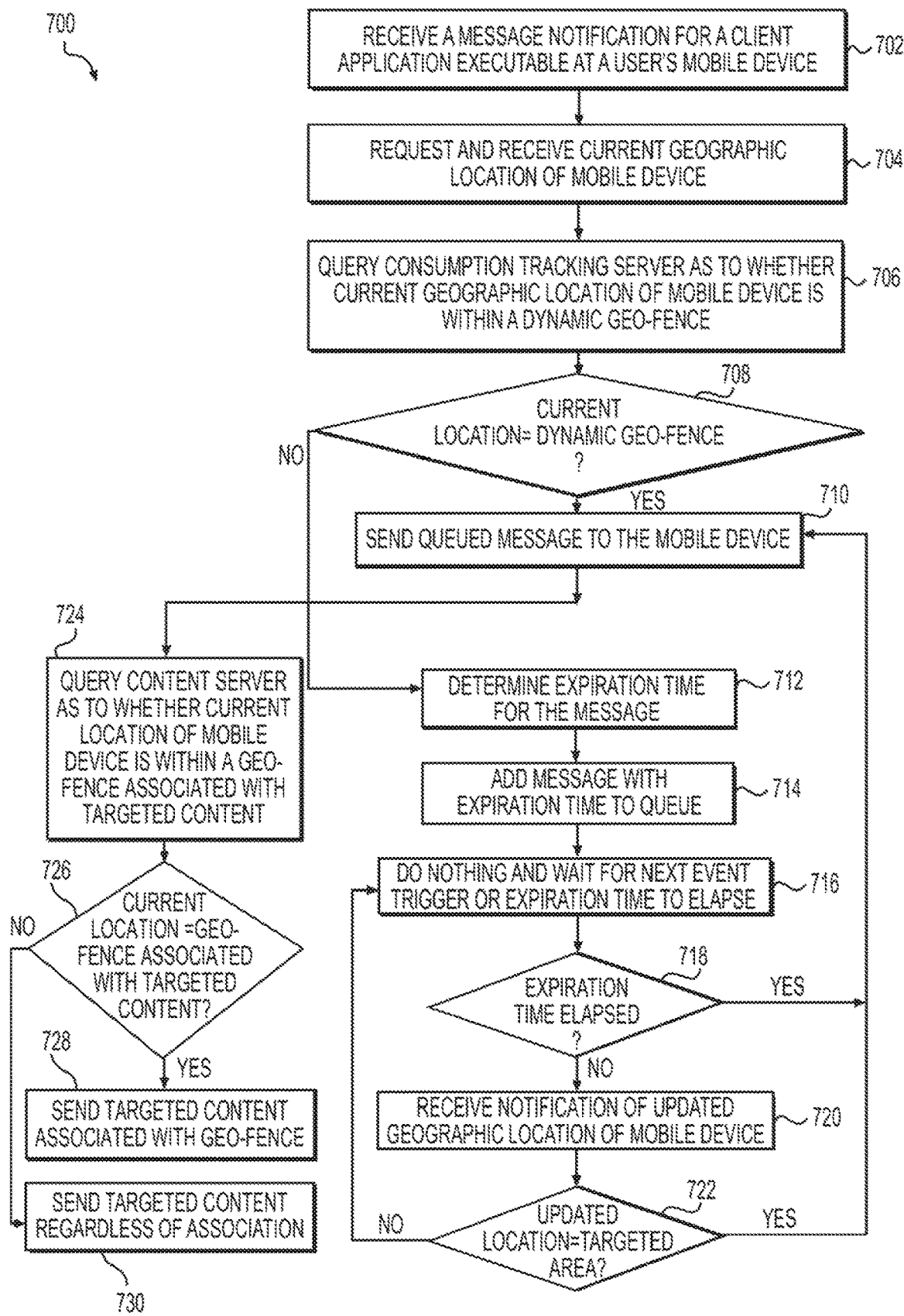
FIG. 7 is a process flow diagram of an exemplary method for optimizing the timing of message notifications for a mobile device user based on a current geographic location of the user's device relative to a dynamic geo-fence.

FIG. 7 is a process flow diagram of an exemplary method 700 for optimizing the timing of message notifications for a mobile device user based on a current geographic location of the user's device relative to a dynamic geo-fence. For purposes of discussion, method 700 will be described using system 200 of FIG. 2 and the components of processes 300, 400, and 500 of FIGS. 3, 4, and 5 (including application server 430, message server 440, content server 450, content consumption server 460, monitoring server 370, current consumption server 380, and launch server 390), as described above, but method 700 is not intended to be limited thereto. As shown in FIG. 7, method 700 includes steps 702, 704, 706, 708, 710, 712, 714, 716, 718, 720, 722, 724, 726, 728, and 730. However, it should be noted that method 700 may include more or fewer steps as desired for a particular implementation. In an example, one or more of the above-listed steps of method 700 may be executed by message server 240 of FIG. 2 or message server 440 of FIGS. 4 and 5, as described above. However, method 700 is not intended to be limited thereto, and the steps of method 700 may be performed by any server (e.g., application server 230 of FIG. 2 or application server 430 of FIGS. 4 and 5) or other type of computing device having at least one processor, a memory, and a network communication interface for sending and receiving information from one or more user devices.

Method 700 begins in step 702, which includes receiving a message notification for a client application executable at a user's mobile device (e.g., user device 210 of FIG. 2 or user device 410 of FIGS. 4 and 5, as described above). In step 704, a current geographic location of the mobile device is requested and received from the mobile device. Steps 706 and 708 may include, for example, determining whether a current geographic location of the mobile device is within a dynamic geo-fence. In some implementations, this determination may be based on a response received from querying a geo-fence server (e.g., geo-fence server 260 of FIG. 2 or consumption tracking server 460 of FIGS. 4 and 5) using the geographic location information received from the user's mobile device. If it is determined in step 708 that the current geographic location of the mobile device is within a dynamic geo-fence (step 708: Yes), method 700 may proceed to step 710, which includes sending a message from a message queue to the mobile device. Once the message has been sent, method 700 may proceed to step 618 of method 600 of FIG. 6, or step 802 of method 800 of FIG. 8, as will be described in further detail below.

Additionally or alternatively, if it is determined in step 708 that the current geographic location of the mobile device is within a dynamic geo-fence, method 700 may proceed to steps 724 and 726. Steps 724 and 726 may include, for example, determining whether a current geographic location of the mobile device is within a geo-fence associated with targeted content. In some implementations, this determination may be based on a response received from querying a content server (e.g., content server 250 of FIG. 2 or content server 450 of FIGS. 4 and 5) using the geographic location information received from the user's mobile device. If it is determined in step 726 that the current geographic location of the mobile device is within a geo-fence associated with targeted content, method 700 may proceed to step 728, which includes retrieving targeted content associated with the geo-fence from the content server. If it is determined in step 726 that the current geographic location of the mobile device is not within a geo-fence associated with targeted content, method 700 may proceed to step 730, which includes retrieving targeted content from the content server regardless of whether or not the targeted content is associated with a geo-fence.

However, if it is determined in step 708 that the current geographic location of the mobile device is not within a dynamic geo-fence (step 508: No), method 700 may proceed to step 712, which includes determining or calculating an expiration time associated with the message. In an example, the expiration time for a message may be based on a priority level assigned to the message, e.g., by an application service provider associated with the client application, as described above. Thus, a message having a relatively higher priority level may be assigned a relatively shorter expiration time, e.g., starting from the time that the message was added to the queue. In step 714, the message is added with the expiration time to the appropriate message queue. Method 700 then proceeds to step 716, which includes waiting for a predetermined event to be triggered or the expiration time of the message to elapse. An example of such a predetermined event includes, but is not limited to, receiving a notification of an updated or detected change in current geographic location for the mobile device.

If it is determined in step 718 that the expiration time for the message has elapsed, method 700 proceeds to step 710, in which the message is sent from the message queue to the user's mobile device. Otherwise, method 700 proceeds to step 720, which may include receiving a notification of an updated geographic location of the mobile device, e.g., a type of predetermined event trigger described above with respect to step 716. In step 722, it is determined whether the updated geographic location of the mobile device is within a dynamic geo-fence.

Figure 9:
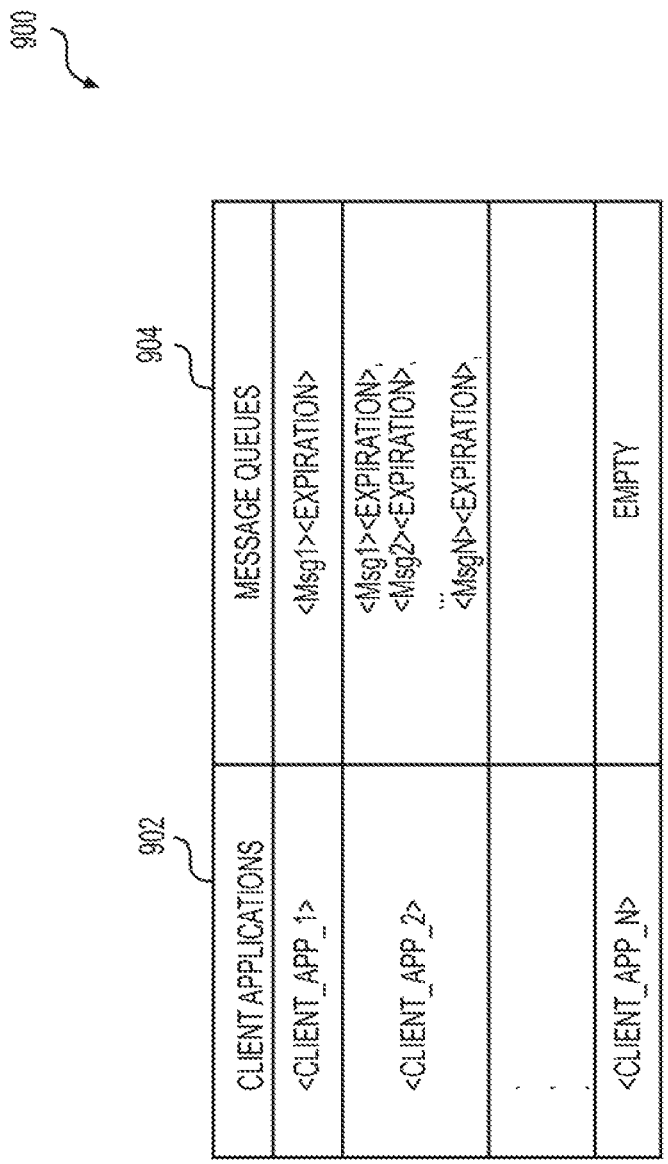
FIG. 9 is an exemplary table for associating different client applications with corresponding message queues.

It should be noted that step 710 may also include first checking the message queue to determine whether it includes any pending messages to be sent to the mobile device for the particular client application. The message queue in this example may be associated with the particular client application. In an example, an association between a queue of messages and a unique identifier associated with the client application may be maintained, e.g., by message server 240 of FIG. 2 or message server 440 of FIGS. 4 and 5, as described above. FIG. 9 shows an exemplary table 900 that may be used for associating different client applications, represented by corresponding client application identifiers 902 and their respective message queues 904. As shown in table 900, each message that is added to a message queue associated with a client application may include an expiration time used to determine the maximum amount of time that the message may be kept in the queue before being sent to the user's device, regardless of its current geographic location, as described above. Table 900 may be stored within a database (e.g., database 245 of FIG. 2) coupled to the server in this example.

Figure 8:
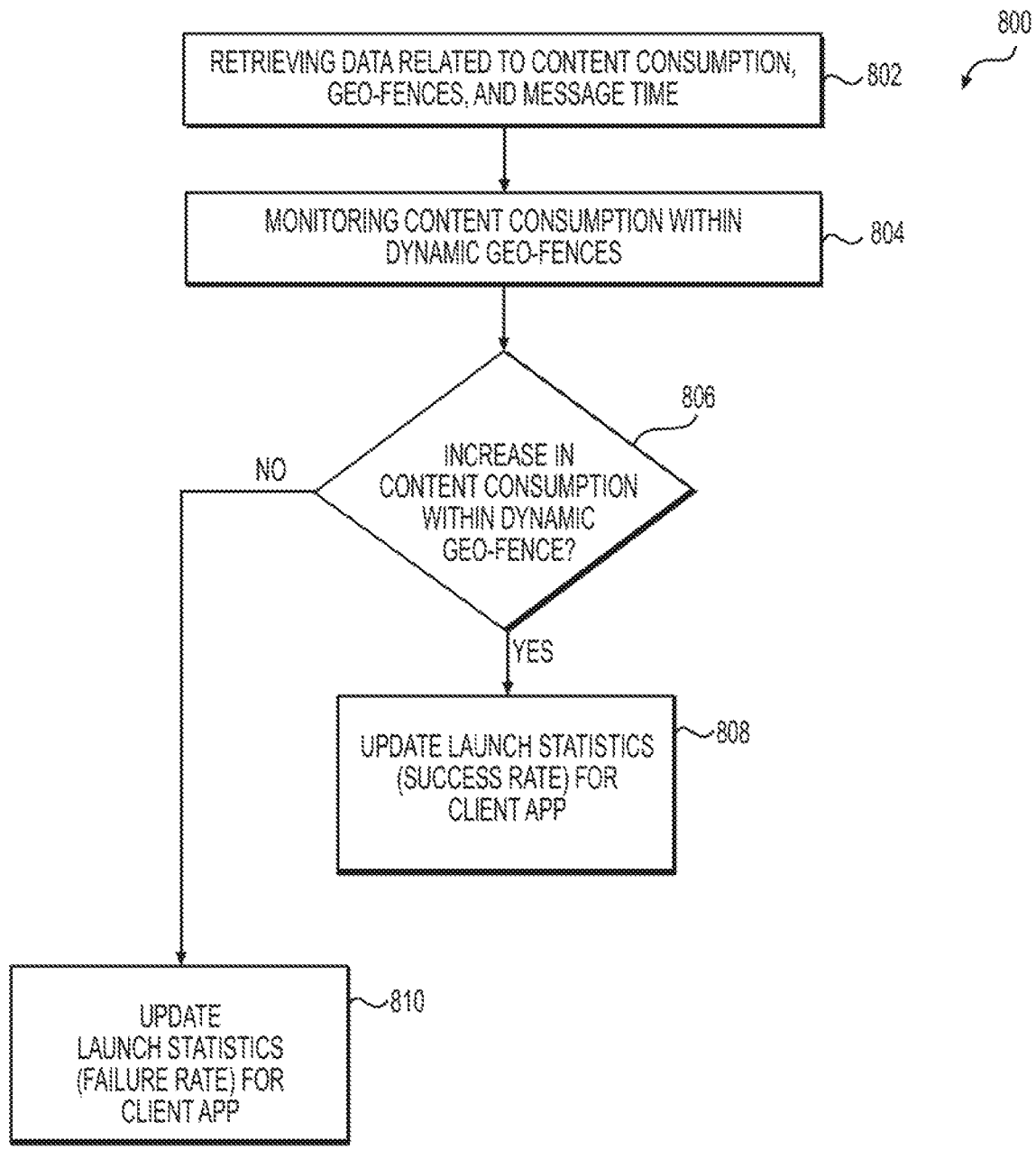
FIG. 8 is a process flow diagram of an exemplary method for updating launch statistics based on the methods in FIGS. 6 and 7.

As described above, method 700 may proceed to step 802 of method 800 after a queued message is sent to the user's mobile device in step 710. As shown by the example of FIG. 8, the steps of method 800 may be used for updating launch statistics based on the message notification sent previously to the user's mobile device, as described above.

Like method 700, method 800 will be described using system 200 of FIG. 2 and the components of processes 300, 400, and 500 of FIGS. 3, 4, and 5, as described above, for discussion purposes only, but method 600 is not intended to be limited thereto. As shown in FIG. 8, method 800 includes steps 802, 804, 806, 808, and 810. However, it should be noted that method 800 may include more or fewer steps as desired for a particular implementation. In an example, one or more of the above-listed steps of method 800 may be executed by message server 240 of FIG. 2 or message server 440 of FIGS. 4 and 5, as described above. However, method 800 is not intended to be limited thereto, and the steps of method 800 may be performed by any server (e.g., application server 230 of FIG. 2 or application server 430 of FIGS. 4 and 5) or other type of computing device having at least one processor, a memory, and a network communication interface for sending and receiving information from one or more user devices.

Method 800 may begin in step 802, which includes retrieving stored information related to the content consumption monitored in step 602, and the location of dynamic geo-fences pursuant to steps 608 and 614 of method 600 of FIG. 6, as described above. Step 802 may also include retrieving a record of the time that the message was sent to and/or received by the user's mobile device (e.g., in step 616 of FIG. 6 or step 710 of method 700), also referred to herein as the "message time."

Method 800 may then proceed to step 804, which includes monitoring content consumption within the dynamic geo-fences. In step 806, the stored information relating to a dynamic geo-fence and message time for the previously sent message may be retrieved for the client application from a memory device or data store (e.g., database 245 of FIG. 2). It is first determined in step 808 whether the content consumption within a dynamic geo-fence increased within the predetermined time period of the message time, as described above. If the content consumption is determined to have increased within the predetermined time period, method 800 proceeds to step 808, in which a set of launch statistics (e.g., a success rate) for the dynamic geo-fence may be updated (e.g., increased or incremented by some predetermined value). In some embodiments, the amount or percentage of increase may also be stored in the launch statistics for success rate.

However, if the content consumption within a dynamic geo-fence does not increase within the predetermined time period (in step 808), method 800 proceeds to step 810, which also includes updating the launch statistics, except that a failure rate is updated (e.g., increased or incremented by some predetermined value). The failure rate may therefore indicate that users did not launch the client application as a result of the notification. Once either the success statistic is updated, step 808, or failure rate is updated, step 810 of method 800 may proceed to step 620 of method 600 of FIG. 6, and data related to retrieved launch statistics from method 800 and the dynamic geo-fence in step 614 may be monitored and stored in steps 602, 604, and/or 620.

Figure 10:
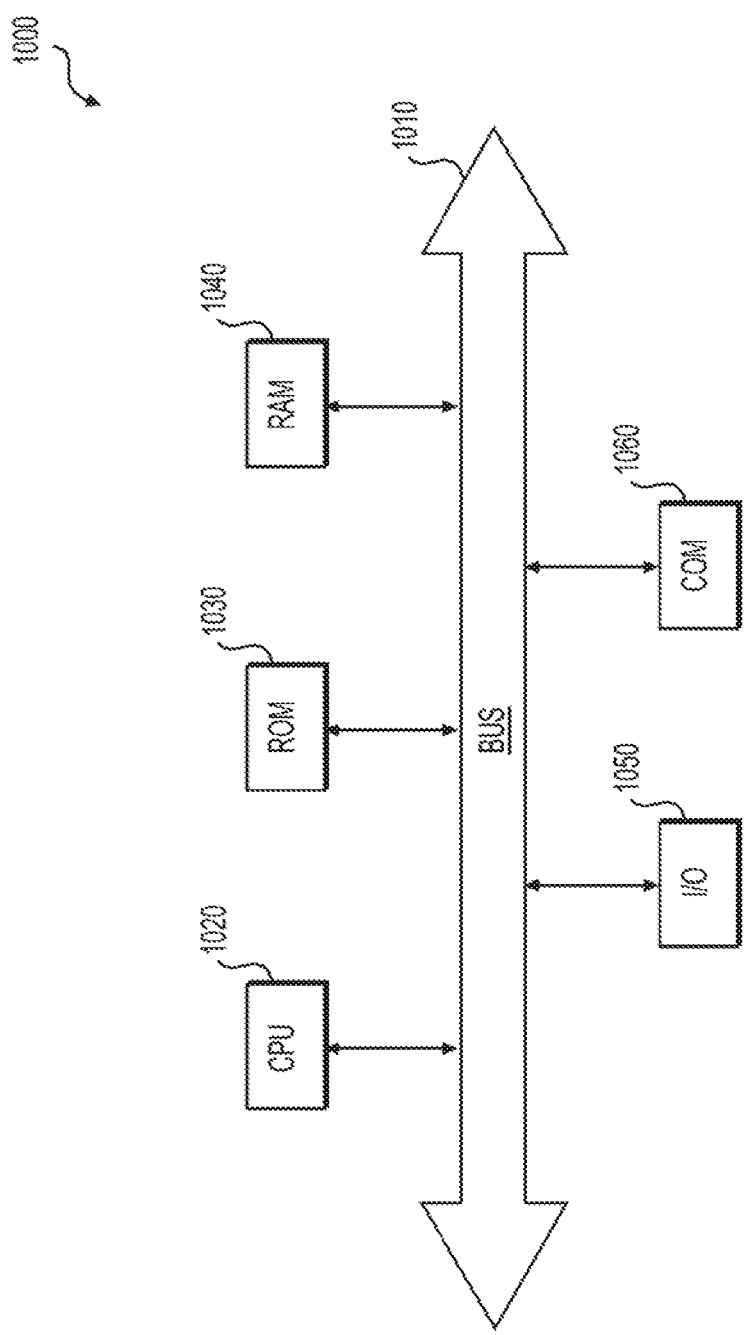
FIG. 10 is a block diagram of an exemplary computer system in which embodiments of the present disclosure may be implemented.

FIG. 10 provides a high-level functional block diagram illustrating an exemplary general purpose computer 1000. It is believed that those skilled in the art are familiar with the structure, programming and general operation of such computer equipment and as a result the drawings should be self-explanatory.

In an example, computer 1000 may represent a computer hardware platform for a server or the like. Accordingly, computer 1000 may include, for example, a data communication interface for packet data communication 1060. The platform may also include a central processing unit (CPU) 1020, in the form of one or more processors, for executing program instructions. The platform typically includes an internal communication bus 1010, program storage and data storage for various data files to be processed and/or communicated by the platform such as ROM 1030 and RAM 1040, although the computer 1000 often receives programming and data via network communications 1070. The hardware elements, operating systems and programming languages of such equipment are conventional in nature, and it is presumed that those skilled in the art are adequately familiar therewith. Computer 1000 also may include input and output ports 1050 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for deploying a dynamic geo-fence to contain a geographic area having a threshold level of content consumption, the method comprising:
    monitoring content consumption by mobile devices across a plurality of users in a network;
    determining a level of the content consumption in a first geographic area;
    if the level of the content consumption in the first geographic area is above a first threshold level of content consumption, generating a first dynamic geo-fence containing the first geographic area;
    delaying delivery of predetermined electronic content to a mobile device, wherein the predetermined electronic content is associated with one or more applications on the mobile device;
    determining that the mobile device is within the first dynamic geo-fence; and
    upon determining that the mobile device is within the first dynamic geo-fence, causing the predetermined electronic content to be displayed on the mobile device.

2. The method of claim 1, wherein, if the level of the content consumption in the first geographic area is above the first threshold level of content consumption, determining whether a level of a content consumption in a second geographic area, adjacent to the first geographic area, is above a second threshold level of content consumption; and
    if the level of the content consumption in the second geographic area is above the second threshold level of content consumption, deploying a second dynamic geo-fence to contain both the first geographic area and the second geographic area.

3. The method of claim 2, wherein the first threshold level of content consumption is the same as the second threshold level of content consumption.

4. The method of claim 1, further comprising:
    creating a visual representation of mobile content consumption and current geo-fences.

5. The method of claim 1, further comprising:
    after deploying the first dynamic geo-fence, determining an updated level of a content consumption within the first dynamic geo-fence.

6. The method of claim 5, further comprising:
determining whether the updated level of the content consumption within the first dynamic geo-fence is below the first threshold level of content consumption; and
when the updated level of the content consumption within the first dynamic geo-fence is below the threshold level of content consumption, determining if a level of a content consumption in a second geographic area, within the first dynamic geo-fence, is above the threshold level of content consumption.

7. The method of claim 6, wherein, when the level of the content consumption in the second geographic area is above the first threshold level of content consumption, decreasing the size of the first dynamic geo-fence to contain only the second geographic area.

8. The method of claim 6, wherein, when the level of the content consumption in the second geographic area is below the first threshold level of content consumption, deleting the first dynamic geo-fence.

9. The method of claim 5, further comprising:
determining if a level of a content consumption in a second geographic area, adjacent to the first dynamic geo-fence, is above the threshold level of content consumption, and, if so, increasing a size of the first dynamic geo-fence to contain both the first geographic area and the second geographic area.

10. The method of claim 1, wherein, when a mobile device is determined to be within the first dynamic geo-fence, sending a message for display to a user at the mobile device via a message notification interface of an operating system of the mobile device.

11. The method of claim 5, further comprising:
determining whether the updated level of the content consumption within the first dynamic geo-fence has increased from the level of the content consumption in the first geographic area; and
updating launch statistics based on the determination.

12. The method of claim 11, wherein updating launch statistics comprises:
updating a success rate when the level of the content consumption within the first dynamic geo-fence is determined to have increased.

13. The method of claim 11, wherein updating launch statistics comprises:
updating a failure rate when the level of content consumption within the first dynamic geo-fence is determined not to have increased.

14. The method of claim 1, further comprising:
storing data related to at least one of a geographic location, a duration of deployment, and a time of deployment for a plurality of dynamic geo-fences.

15. The method of claim 14, further comprising:
analyzing the stored data to determine if there is a pattern associated with one of the plurality of dynamic geo-fences.

16. The method of claim 15, further comprising:
if a pattern associated with one of the plurality of dynamic geo-fences is determined, creating a historic geo-fence for the geographic location contained within the one of the plurality of dynamic geo-fences.

17. A system for deploying a dynamic geo-fence to contain a geographic area having a threshold level of content consumption, the system comprising:
a memory having processor-readable instructions stored therein; and
a processor configured to access the memory and execute the processor-readable instructions, which when executed by the processor configures the processor to perform a plurality of functions, including functions to:
monitor a mobile content consumption across a plurality of users;
determine a level of a content consumption in a first geographic area;
if the level of the content consumption in the first geographic area is above a first threshold level of content consumption, generate a first dynamic geo-fence containing the first geographic area;
delay delivery of predetermined electronic content to a mobile device, wherein the predetermined electronic content is associated with one or more applications on the mobile device;
determine that the mobile device is within the first dynamic geo-fence; and
upon determining that the mobile device is within the first dynamic geo-fence, cause the predetermined electronic content to be displayed on the mobile device.

18. The system of claim 17, wherein the processor is configured to perform functions to:
determine whether a mobile device is within the first dynamic geo-fence; and
if the mobile device is within the first dynamic geo-fence, send a message for display to a user at the mobile device via a message notification interface of an operating system of the mobile device.

19. A computer readable medium storing instructions that, when executed by a computer, cause the computer to perform functions to:
monitor a mobile content consumption across a plurality of users;
determine a level of a content consumption in a first geographic area;
if the level of the content consumption in the first geographic area is above a first threshold level of content consumption, generate a first dynamic geo-fence containing the first geographic area;
delay delivery of predetermined electronic content to a mobile device, wherein the predetermined electronic content is associated with one or more applications on the mobile device;
determine that the mobile device is within the first dynamic geo-fence; and
upon determining that the mobile device is within the first dynamic geo-fence, cause the predetermined electronic content to be displayed on the mobile device.

20. The computer-readable medium of claim 19, wherein the processor is configured to perform functions to:
determine whether a mobile device is within the first dynamic geo-fence; and
if the mobile device is within the first dynamic geo-fence, send a message for display to a user at the mobile device via a message notification interface of an operating system of the mobile device.

* * * * *